United States Patent
Honjo et al.

(10) Patent No.: US 6,424,483 B1
(45) Date of Patent: *Jul. 23, 2002

(54) CONTROL SYSTEM OF TAPE TRAVEL FOR A MAGNETIC RECORDING AND REPRODUCING APPARATUS

(75) Inventors: Kenichi Honjo, Katano; Haruo Isaka, Yawata; Satoshi Ohyama, Ashiya; Masafumi Nishida, Ibaraki; Yoshio Sakakibara, Neyagawa; Toshiyuki Kohri, Hirakata; Koji Sakurai, Neyagawa, all of (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/751,480

(22) Filed: Nov. 18, 1996

(30) Foreign Application Priority Data

Nov. 21, 1995 (JP) .............................. 7-301839
Feb. 20, 1996 (JP) .............................. 8-058340
Mar. 12, 1996 (JP) .............................. 8-054610

(51) Int. Cl.$^7$ .............................................. G11B 15/52
(52) U.S. Cl. ................................ 360/73.11; 360/73.07
(58) Field of Search .............................. 360/73.12, 27, 360/73.13, 73.11, 73.01, 73.02, 72.3, 74.3, 74.1, 74.4, 77.4, 74.2, 73.04, 73.07, 77.12–77.14, 4, 32; 386/79, 13, 14, 57, 78, 87, 12

(56) References Cited

U.S. PATENT DOCUMENTS

| 4,044,389 A | * | 8/1977 | Oldershaw et al. | ... 360/73.11 X |
| 4,373,171 A | * | 2/1983 | Dengler et al. | ...... 360/73.04 X |
| 4,393,416 A | * | 7/1983 | Takeuchi et al. | ............... 386/79 |
| 4,656,537 A | * | 4/1987 | Toba et al. | ............... 360/73.01 |
| 4,692,819 A |   | 9/1987 | Steele | ........................ 360/72.1 |

(List continued on next page.)

FOREIGN PATENT DOCUMENTS

| EP | 0 368 511 | 5/1990 | |
| EP | 0 564 234 A2 | 10/1993 | ......... G11B/15/467 |
| JP | 05002799 | 1/1993 | ......... G11B/15/467 |
| JP | 06103501 | 4/1994 | ............ G11B/5/008 |

OTHER PUBLICATIONS

Patent Abstracts of Japan, No. 04011345, published Jan. 16, 1992.
Patent Abstracts of Japan, No. 07192357, published Jul. 28, 1995.

*Primary Examiner*—David Hudspeth
*Assistant Examiner*—K. Wong
(74) *Attorney, Agent, or Firm*—Parkhurst & Wendel, L.L.P.

(57) ABSTRACT

A magnetic recording and reproducing device according to the present invention operates with steps of moving a magnetic tape having a plurality of tracks per frame and a plurality of control signals recorded thereon, keeping count of the pulses of a frequency generator signal corresponding to the rotation of a capstan motor by a frequency generator counter, resetting the count of the frequency generator pulses by the control signal reproduced by a fixed magnetic head, detecting the track number by the control signal counter reset by a frame reference signal, controlling, at the start, the start timing on the basis of the tape stop position detected by the frequency generator pulse counter and control counter and the reference frame signal from the reference frame signal generator. The device prevents thinning of tracks at the editing point in after-break recording and the disturbance of images immediately after the start. The device does not require a special circuit or complicated software-wise processing, and provides a stabilized slow-reproduced image. Further, in a magnetic recording and reproducing device for intermittent recording, there is no danger of causing thinning to recorded tracks. Thus, a reproduced image of high quality can be obtained.

2 Claims, 22 Drawing Sheets

U.S. PATENT DOCUMENTS

| | | | |
|---|---|---|---|
| 4,698,703 A | | 10/1987 | Nishimura et al. ...... 360/73.06 |
| 4,731,679 A | * | 3/1988 | O'Gwynn et al. ..... 360/72.2 X |
| 4,780,774 A | * | 10/1988 | Edakubo et al. ......... 360/73.12 |
| 4,811,130 A | * | 3/1989 | Takayama ................ 360/77.11 |
| 4,819,087 A | * | 4/1989 | Takeuchi et al. .......... 360/13 X |
| 4,882,634 A | * | 11/1989 | Satoh et al. ............... 360/10.2 |
| 5,063,470 A | * | 11/1991 | Fukuzawa et al. ........ 360/13 X |
| 5,079,650 A | * | 1/1992 | Kozuki et al. ............. 360/74.4 |
| 5,339,200 A | * | 8/1994 | Koyama et al. ....... 360/74.2 X |
| 5,383,069 A | * | 1/1995 | Morita et al. ............ 360/73.11 |
| 5,473,477 A | | 12/1995 | Takeda ........................ 386/75 |
| 5,500,775 A | * | 3/1996 | Fujita et al. .................. 360/70 |
| 5,523,895 A | | 6/1996 | Takayama .................. 360/10.2 |
| 5,604,648 A | * | 2/1997 | Oh .......................... 360/73.11 |
| 5,825,971 A | | 10/1998 | Inoue et al. ................ 386/122 |

\* cited by examiner

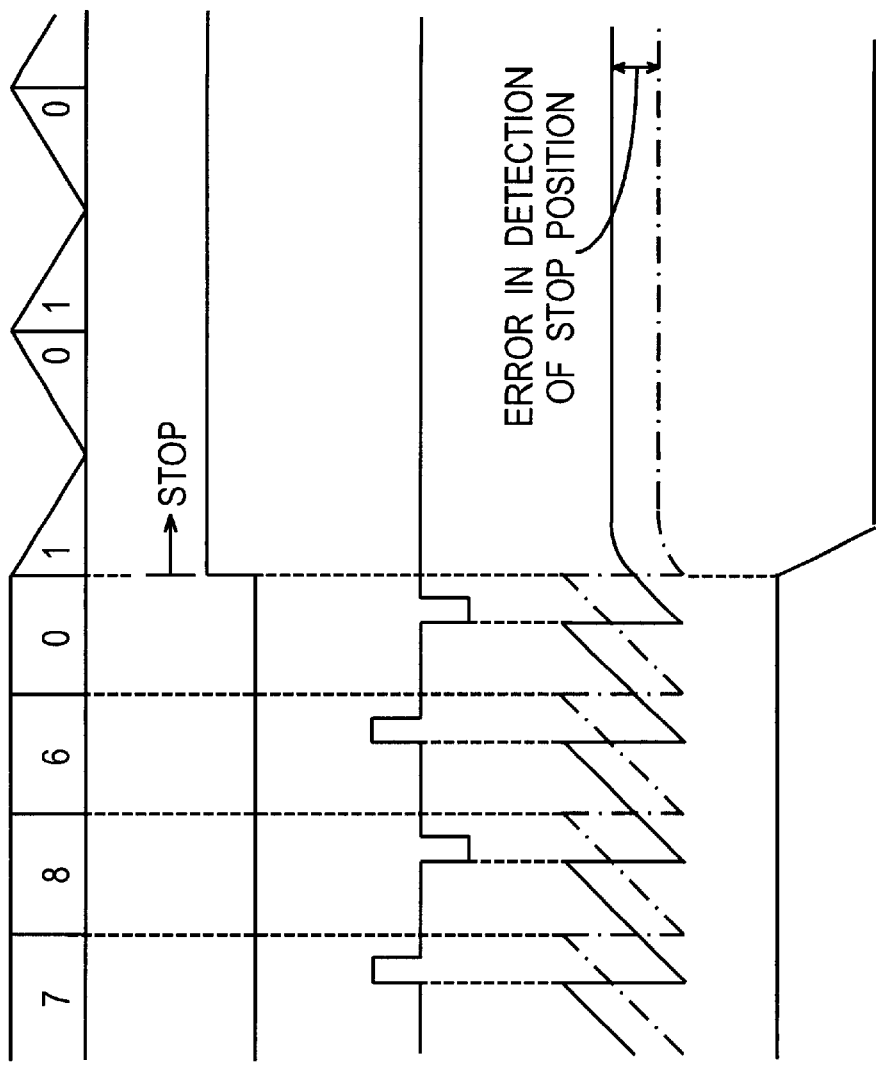

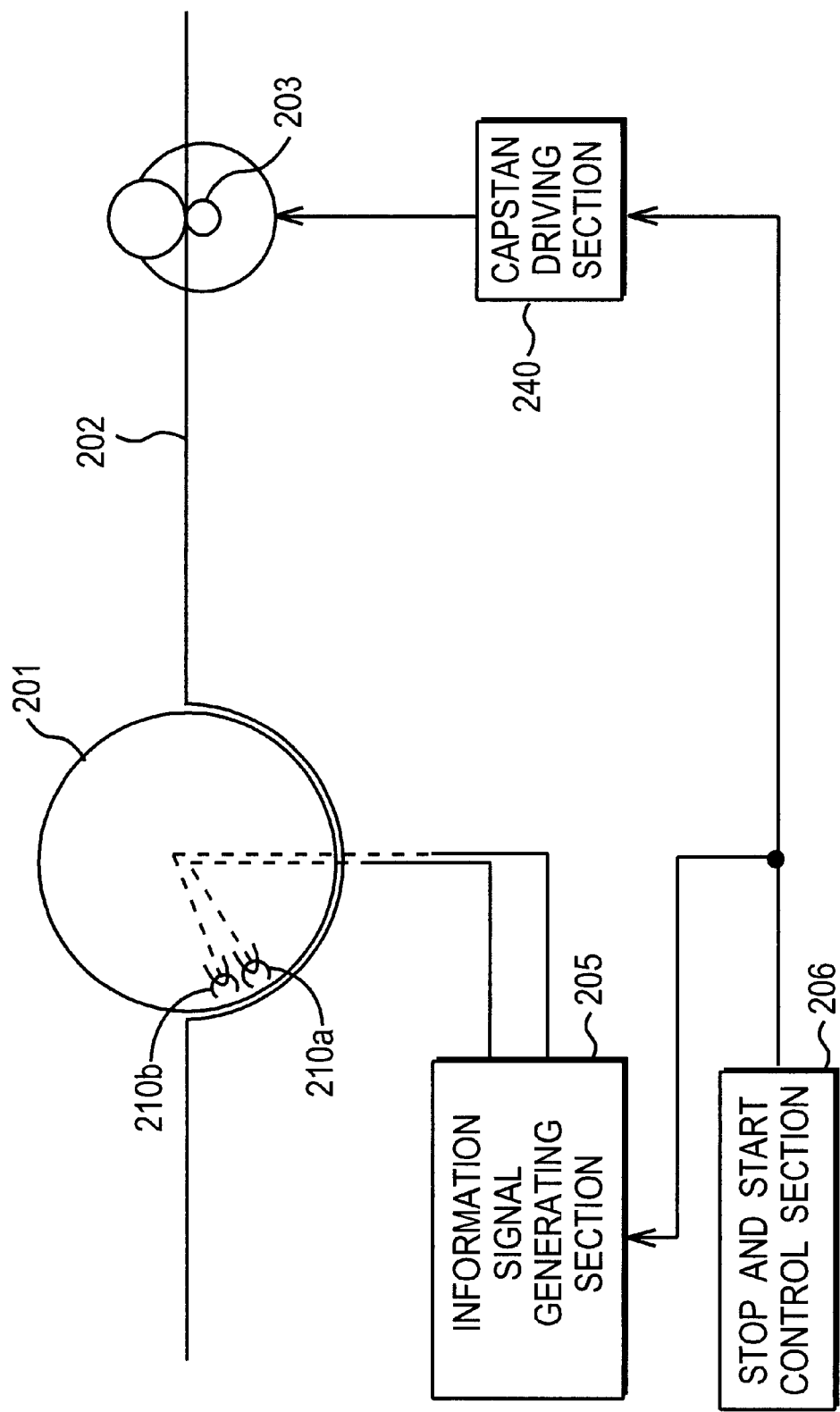

CONTROL SYSTEM OF TAPE TRAVEL FOR A MAGNETIC RECORDING AND REPRODUCING APPARATUS

FIELD OF THE INVENTION

The present invention relates to a magnetic recording and reproducing device for recording and reproducing information signals as oblique tracks on a magnetic tape by a rotary magnetic head.

BACKGROUND OF THE INVENTION

In a magnetic recording and reproducing device for recording and reproducing information signals as oblique tracks on a magnetic tape, normally, helical scanning has heretofore been performed using a rotary magnetic head. Further, a signal to be recorded on a magnetic tape is divided according to the number of tracks to suit this reproducing system.

At this time, for example, as in the approach run interval for an after-break recording, there are cases where a reference signal is present with which the signal to be reproduced should synchronize. In such case, synchronism can be achieved by directly or indirectly comparing phases between the reference signal produced in the device and the signal reproduced from the magnetic tape, and reflecting the result on the tracking control.

In the case of a home-use VTR (such as VHS), one field is recorded as one track, and one frame as two tracks. In reproducing the same, a control (hereinafter referred to as CTL) signal (usually, one pulse per frame) is recorded in a linear track prepared separate from the oblique tracks, and tracking control is effected such that it synchronizes with the reference signal produced in the device.

Further, there is an example in which one frame is divided into 20 to 24 tracks as in a business-use VTR (D1). In this case also, a CTL track is present, and a servo signal of one pulse per drum revolution (four tracks) and a frame signal of one pulse per frame are recorded, and in the case where external synchronism is to be effected, the same control as in said home-use VTR has been performed using a frame signal, as disclosed in, e.g., a magazine "BROADCASTING TECHNIQUE", 1990, Vol. 43, No. 12.

Further, there is another example in which a signal for one frame is dividedly recorded on 10 tracks of a magnetic tape, as in the case of a home-use digital VTR. In the signal reproduction processing, there is a reference frame signal to be synchronized, and this reference frame signal is compared, in respect of phase, with the frame phase information reproduced from the magnetic tape, the result being reflected on the tracking control, thereby achieving synchronism for the frame.

With the aforesaid VTR, there arises a need for synchronism with the reference signal when reproduction is started. Since the synchronism pull-in speed is limited by the frame frequency, in the case of a VTR whose frame frequency is 30 Hz in NTSC it sometimes becomes impossible to attain the sufficient pull-in speed. Particularly at the time of after-break recording, since the operator gives an image recording instruction at the time he ascertains the image he intends to record, the time taken for start-frame synchronism leads to a failure in recording the image and sound.

Therefore, in order to accelerate frame synchronism from the state in which the tape stops running, there is invented a method, as disclosed, e.g., in Japanese Laid-open Unexamined Patent Application No. 7-192357, in which when a magnetic tape is stopped, its position is recorded, thereby regulating the start timing with respect to the reference signal.

This known magnetic recording and reproducing device, however, has the following disadvantages:

In the tape running state, the count of the FG pulses is reset by the reference signal produced in the device without direct connection with the recorded position on the magnetic tape, the error in detecting the position of the track relative to the head during the tape stoppage is increased due to the tracking deviation or offset. Particularly in the case of a narrow track and high density record VTR, immediate landing on a predetermined track is impossible, causing the disturbance of image immediately after the start or causing the thinning of tracks at the editing point during after-break recording.

In conventional examples, in slow reproduction of recorded signals, a special arrangement and action are required which are different than in the ordinary reproduction. For example, concerning the slow system by intermittent feed, in the conventional system for obtaining slow images by intermittently moving a magnetic tape each time by one frame or by one field, there are disadvantages in that a plurality of magnetic heads are installed on a cylinder to be selectively used according to the mode or in that a special circuit and a complicated software-wise processing are required in order to obtain a stabilized slowly reproduced image.

Further, in a VTR which intermittently records as in time-lapse recording, start and stop are repeated at predetermined intervals so as to successively record the information on a magnetic tape. In conventional examples, precision control of the position of a track to be recorded is difficult at the time of start and stop, resulting in erasing adjacent tracks during recording or in envelope chipping during reproduction, thus detracting from the quality of images. Particularly in a VTR which records at high density with small track width, this influence is so strong that in the worst case it occurs that images cannot be recorded.

Accordingly, there is a method, as disclosed in Japanese Laid-open Unexamined Patent Application No. 59-127255, in which the magnetic tape is driven backward a little, from which position it is then driven forward so as to allow recording during the period when the tape running speed is stabilized. This conventional example also, however, does not allow immediate recording with the desired timing, thus leading to a failure in recording or to a disadvantage that the arrangement is complicated.

DISCLOSURE OF THE INVENTION

The present invention has been accomplished with the above-mentioned disadvantages taken into consideration, and is intended to provide a magnetic recording and reproducing device which prevents the thinning of tracks at the editing point during after-break recording and also prevents the disturbance of image immediately after the start.

Another object of the invention is to provide a magnetic recording and reproducing device, with which it is possible to obtain a slowly reproduced image without requiring a special circuit or complicated software-wise processing.

Still another object of the invention is to provide a magnetic recording and reproducing device of the intermittent recording type, which which it is possible to obtain a reproduced image of high quality without causing thinning to a track to be recorded.

To achieve these objects, the magnetic recording and reproducing device of the present invention is characterized by keeping count of the FG pulses corresponding to the rotation of the capstan motor in the running state of the magnetic tape by FG pulse counting means, said count of the FG pulses being reset by the CTL signal on the magnetic tape reproduced by a fixed magnetic head, wherein at the time of start, the start timing is controlled on the basis of the tape stop position detected by the FG pulse counting means.

With such device, it is possible to prevent the thinning of tracks at the editing point during after-break recording and the disturbance of image immediately after the start.

Further, to achieve said another object, the magnetic recording and reproducing device is characterized in that the capstan motor for moving the magnetic tape is driven in synchronism with the reference signal from reference frame signal generating means, in that the magnetic tape is fed by an amount corresponding to M frames on the basis of reproduction frame phase information and then stopped for a time corresponding to N frames, whereby M/(M+N) times slower reproduction is effected.

With such device, it is possible to obtain a stabilized slowly reproduced image without requiring a special circuit or complicated software-wise processing.

To achieve said still another object, the magnetic recording and reproducing device is characterized in that at least two adjacent magnetic heads for recording tracks of different azimuth angles by a first magnetic head and a second magnetic head which follows the first are mounted on a rotary drum, the arrangement being such that the magnetic tape is stopped after termination of recording by the first and second magnetic heads, the magnetic tape being fed by an amount corresponding to two tracks from the time the first magnetic head starts recording until the time the first magnetic head starts the next recording.

According to such device, it is possible, in a magnetic recording and reproducing device for intermittent recording, to obtain a reproduced image of high quality without causing thinning to a track to be recorded.

In a preferred embodiment of the invention, a magnetic tape having a plurality of tracks and a plurality of CTL signals recorded thereon per frame is moved while the number of pulses of the FG signal corresponding to the rotation of the capstan motor are counted all the time, the count of the FG pulses being reset by the CTL signal reproduced from the magnetic tape by the fixed head, and at the time of start the start timing for the magnetic tape is controlled on the basis of the tape position detected by FG pulse counting means and CTL counting means and on the basis of a reference frame signal from reference signal generating means.

For this reason, the thinning of tracks at the editing point in the after-break recording and the disturbance of images immediately after the start are prevented, and a special circuit or a complicated software-wise processing is not required, providing a stabilized slowly reproduced image, and in a magnetic recording and reproducing device of the intermittent recording type, there is no possibility of the thinning of recorded tracks, and a high quality of image is obtained.

BRIEF DESCRIPTION OF THE DRAWINGS

FIG. 2 is a time chart for the magnetic recording and reproducing device shown in FIG. 1;

FIG. 13 is a block diagram of a magnetic recording and reproducing device showing a sixth embodiment of the invention;

DESCRIPTION OF THE INVENTION

Preferred embodiments of the present invention are shown in FIGS. 1 through 22.

A magnetic recording and reproducing device showing a first embodiment of the invention will now be described.

Figure 1:
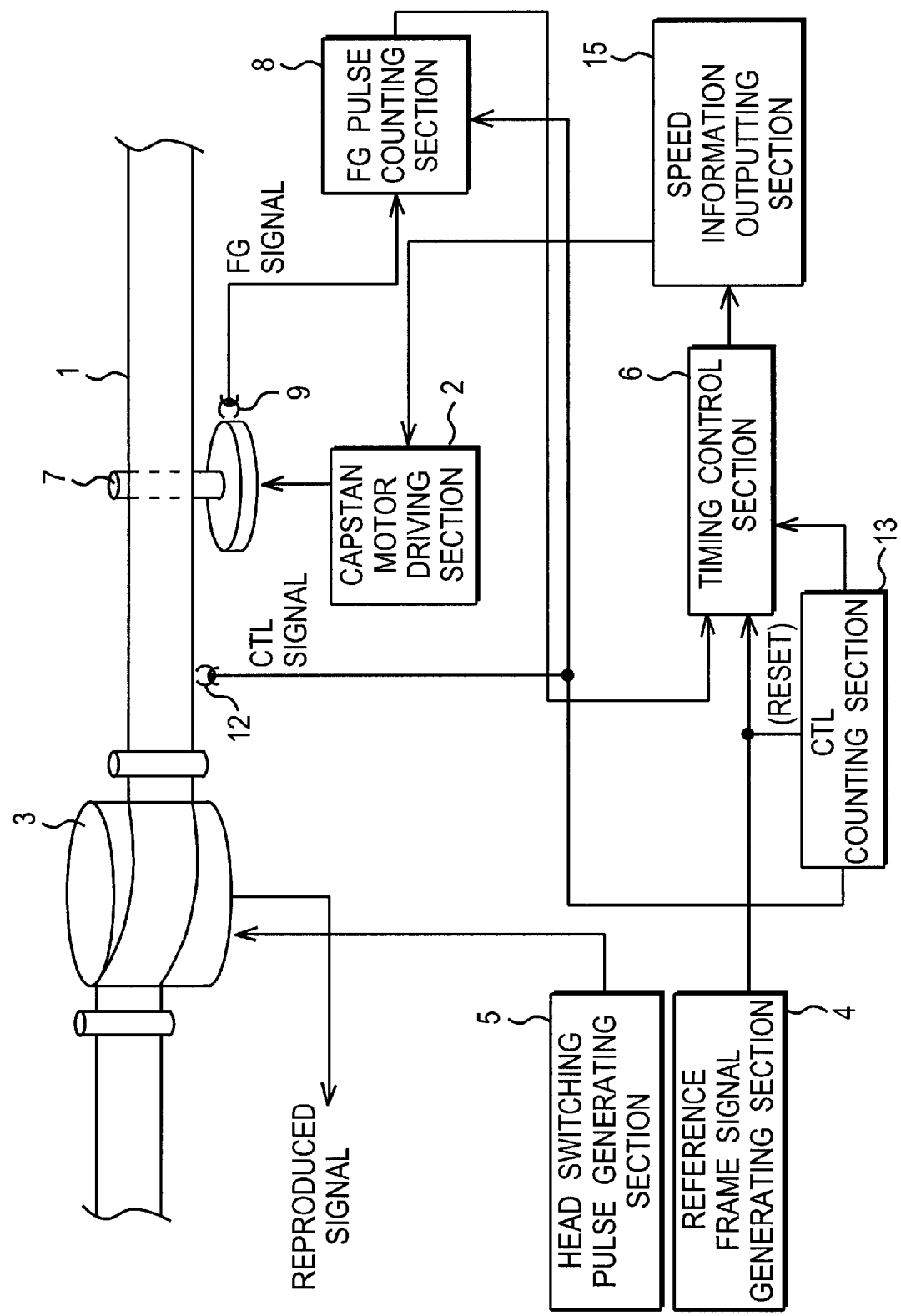
FIG. 1 is a block diagram of a magnetic recording and reproducing device showing a first embodiment of the invention.

FIG. 1 is a block diagram showing the arrangement of the magnetic recording and reproducing device according to the first embodiment. In FIG. 1, the numeral 4 denotes a reference frame signal generator for generating a reference frame signal to serve as a reference signal which is synchronous with the frame frequency; 5 denotes a head switching pulse generator for generating a head switching pulse signal to serve as a reference signal which is synchronous with the reference frame signal from the reference frame signal generator 4; 1 denotes a magnetic tape having one frameful of information dividedly recorded on 10 oblique tracks and CTL signals recorded thereon in the direction of travel; 7 denotes a capstan motor for feeding the magnetic tape 1; 3 denotes a drum having a plurality of magnetic heads arranged therein at predetermined intervals and adapted to switch said magnetic heads, while simultaneously rotating the latter, in synchronism with the head switching pulse from the head switching pulse generator 5 so as to reproduce the oblique tracks of the magnetic tape 1 by using said heads; 2 denotes a capstan motor drive section; 9 denotes an FG detector for detecting FG signals magnetized on the capstan motor 7; 12 denotes a fixed magnetic head for reproducing CTL signals recorded on the magnetic tape 1; 8 denotes an FG pulse counting section adapted to be reset by the CTL signal; 13 denotes a CTL counting section for counting the pulses of the CTL signal; and 6 denotes a timing control section for controlling the timing with which switching to the running state is made on the basis of the speed information from a speed information output section 15.

With the magnetic recording and reproducing device arranged in the manner described above, the operation thereof will be described with reference to FIG. 2.

First, the transition of the magnetic tape 1 from the running state to the stop state will be described.

FIG. 2 is a timing chart showing the transition from the normal reproduction state to the stop state. In an example shown in FIG. 2(a), the 10 tracks corresponding to one frameful of information are numbered from 0 to 9. The track number, being reproduced now, can be detected by counting the pulses of the CTL signal at the CTL count section adapted to be reset by the reference frame signal from the reference frame signal generator 4 in the normal reproduction state.

In the running state of the magnetic tape 1, the FG pulses are counted up by the FG pulse counting section 8 as shown in solid line in FIG. (d), reproduced as shown in FIG. 2(c) by the fixed magnetic head 12, and reset by one pulse of the CTL signal per track. The magnetic tape 1 is immediately decelerated until it is stopped as shown in FIG. 2(e), by a tape feed stop instruction. At this time, the count of the FG pulses counted by the FG pulse counting section 8 indicates the value from the CTL signal reproduction position on the magnetic tape. For this reason, the stop position of the magnetic tape can be accurately detected on the basis of the FG pulse count provided by the FG pulse counting section 8.

On the other hand, in the prior art, since the FG pulse count is reset with the timing synchronous with the reference signal, as shown in dash-dot lines in FIG. 2(d), the stop position is predicted on the basis of the reference signal having no interrelation to said recording position on the magnetic tape, resulting in an error in detection due to tracking deviation or offset.

A description will now be given of an operation in which the magnetic tape 1 makes a stop to start transition.

FIG. 3 schematically shows the relation of the relative positions between the rotary magnetic head mounted on the drum 3 and the recorded track on the magnetic tape 1.

Figure 3A:
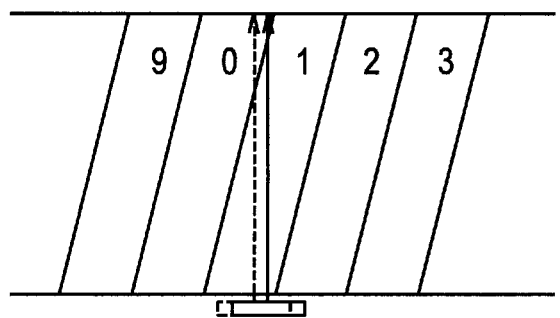
FIGS. 3 (a), (b) and (c) are motion explaining charts showing the magnetic recording and reproducing device shown in FIG. 1 making the transition from stop to normal run.

FIG. 3(a) shows the relation of the relative positions between the rotary magnetic head and the tracks at the tape stoppage. In FIG. 3(a), the dotted line indicates the ideal stop position. The solid line indicates the actual stop position.

Figure 3B:
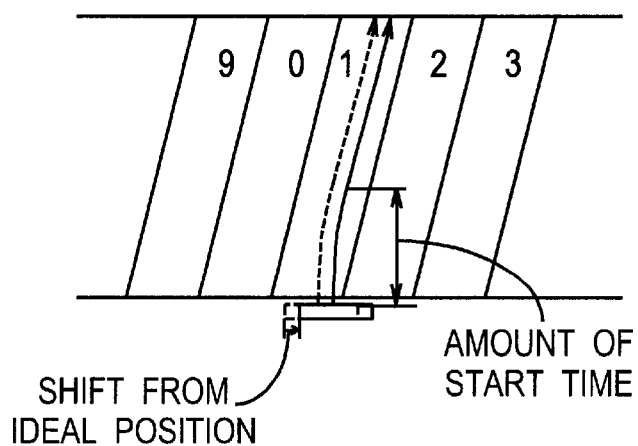

As shown in FIG. 3(b), in this example, if a start is made with a timing which delays by an amount of time corresponding to one frame behind the reference frame signal generated by the reference signal generator 4, then, immediately after the start, reproduction is effected with the tracking deviated as shown in the solid line from the ideal state shown in the dotted line.

Figure 3C:
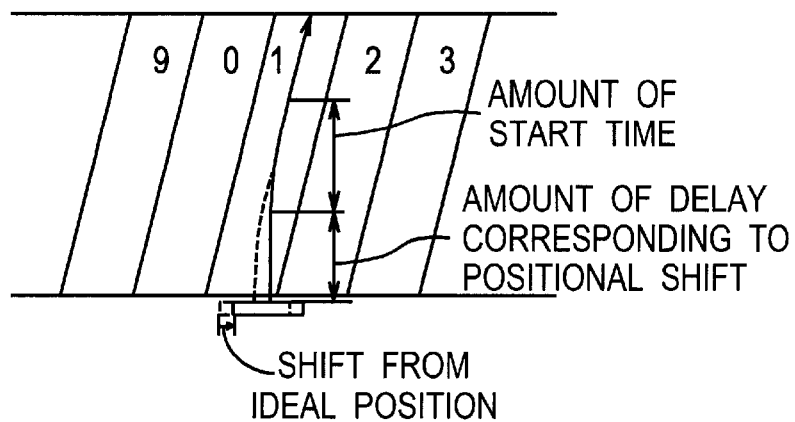

Accordingly, as shown in FIG. 3(c), by delaying the start timing in accordance with the positional deviation from the ideal position shown in dotted line calculated from the FG pulse count, tracking can be accurately effected even immediately after the start, as shown in the solid line.

Figure 4A:
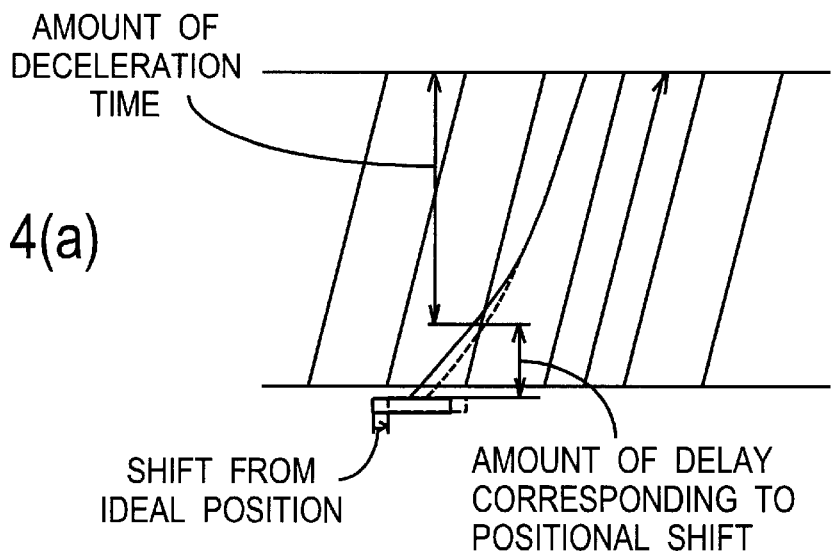
FIGS. 4(a) and (b) are motion explaining charts showing the magnetic recording and reproducing device shown in FIG. 1 making the transition from search slow to normal run.

Further, FIG. 4 schematically shows the relation of the relative positions between the rotary magnetic head and the track in the case of a search slow to normal run transition (one times greater speed). As shown in FIG. 4(a), during the transition from the search state to the normal running state, the tracking can be accurately effected by setting the deceleration timing by taking into account the amount of deceleration time dependent on speed information and the amount of deceleration time dependent on the deviation from the ideal position.

Figure 4B:
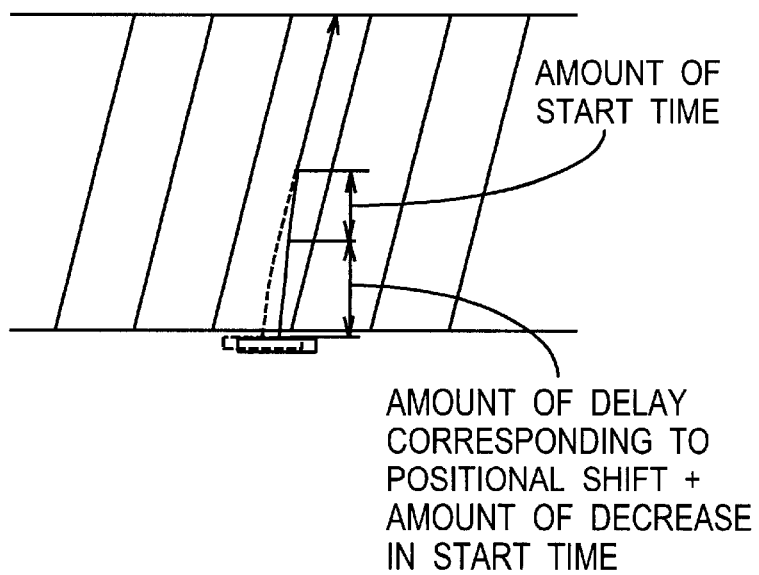

Further, during the transition from the slow run to the normal run also, the tracking can be likewise accurately effected by setting the start timing by taking into account the amount of start time dependent on speed information and the amount of delay time dependent on the deviation from the ideal position, as shown in FIG. 4(b).

As has been described so far, in the magnetic recording and reproducing device according to the first embodiment, the relative position of the track with respect to the magnetic head at the time of tape stoppage can be accurately detected by counting the FG pulses corresponding to the rotation of the capstan motor during the running of the magnetic tape and resetting the count by the CTL signal recorded on the linear track on the magnetic tape.

Further, at the start, the start timing is controlled on the basis of the stop position detected at the time of stoppage of the tape run, whereby the immediate on-track action is possible even immediately after the start, so that a stabilized image can be obtained. Particularly, stabilized high speed pull-in can be achieved in a VTR which operates on the basis of narrow track high density recording.

Further, detection of the CTL signal on the magnetic head by the fixed magnetic head allows the tape position to be correctly detected even during transients caused by a brake mechanism or the like.

Further, even if the magnetic tape is running at a speed different than in the normal run as in the case of the search or slow state, the tracking can be accurately effected during the transition to the normal run.

Further, in the tape running state, the FG pulses corresponding to the rotation of the capstan motor can be counted at all times, so that the magnetic tape stop timing can be optionally set.

A magnetic recording and reproducing device showing a second embodiment of the invention will now be described.

Figure 5:
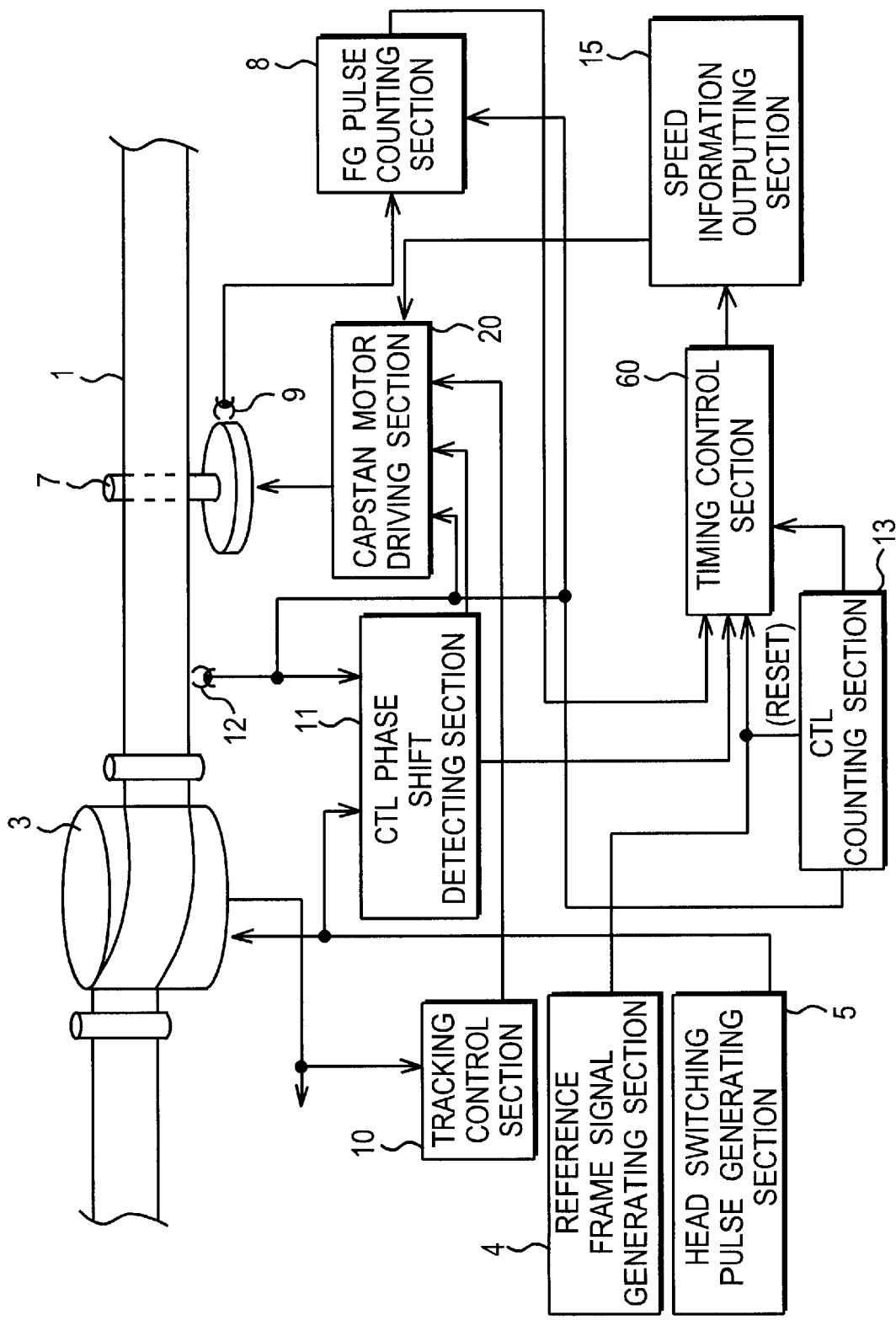
FIG. 5 is a block diagram of a magnetic recording and reproducing device showing a second embodiment of the invention.

FIG. 5 is a block diagram showing the arrangement of the magnetic recording and reproducing device according to the second embodiment. In addition, those parts which function in the same way as in the magnetic recording and reproducing device of the first embodiment are given the same reference characters and a description thereof is omitted.

In FIG. 5, the numeral 1 denotes a magnetic tape wherein one frameful of information is divided for 10 oblique tracks and a pilot signal is multi-recorded thereon and CTL signals are recorded thereon in the direction of travel of the tape; 10 denotes a tracking control section for detecting a pilot signal contained in a signal to be reproduced from the drum 3 to output a tracking error signal; 11 denotes a CTL phase shift detecting section for comparing the CTL signal from the fixed magnetic head 12 with the head switching signal from the head switching pulse generator 5 to detect and store the phase shift of the CTL signal; 20 denotes a capstan motor driving section which effects tracking control by selecting the CTL signal from the fixed magnetic head and the tracking error signal from the tracking control section 10 and which, when using the CTL signal to effect tracking control, controls as an error signal the phase shift with respect to the output of the CTL phase shift detecting section 11; 60 denotes a timing control section for controlling the timing for starting the running of the magnetic tape 1 on the basis of the output from the CTL phase shift detecting section 11, the FG pulse count from the FG pulse counting section 8, and the reference frame signal from the reference frame signal generator 4.

With the magnetic recording and reproducing device arranged in the manner described above, the operation thereof will be described with reference to FIG. 6.

Figure 6:
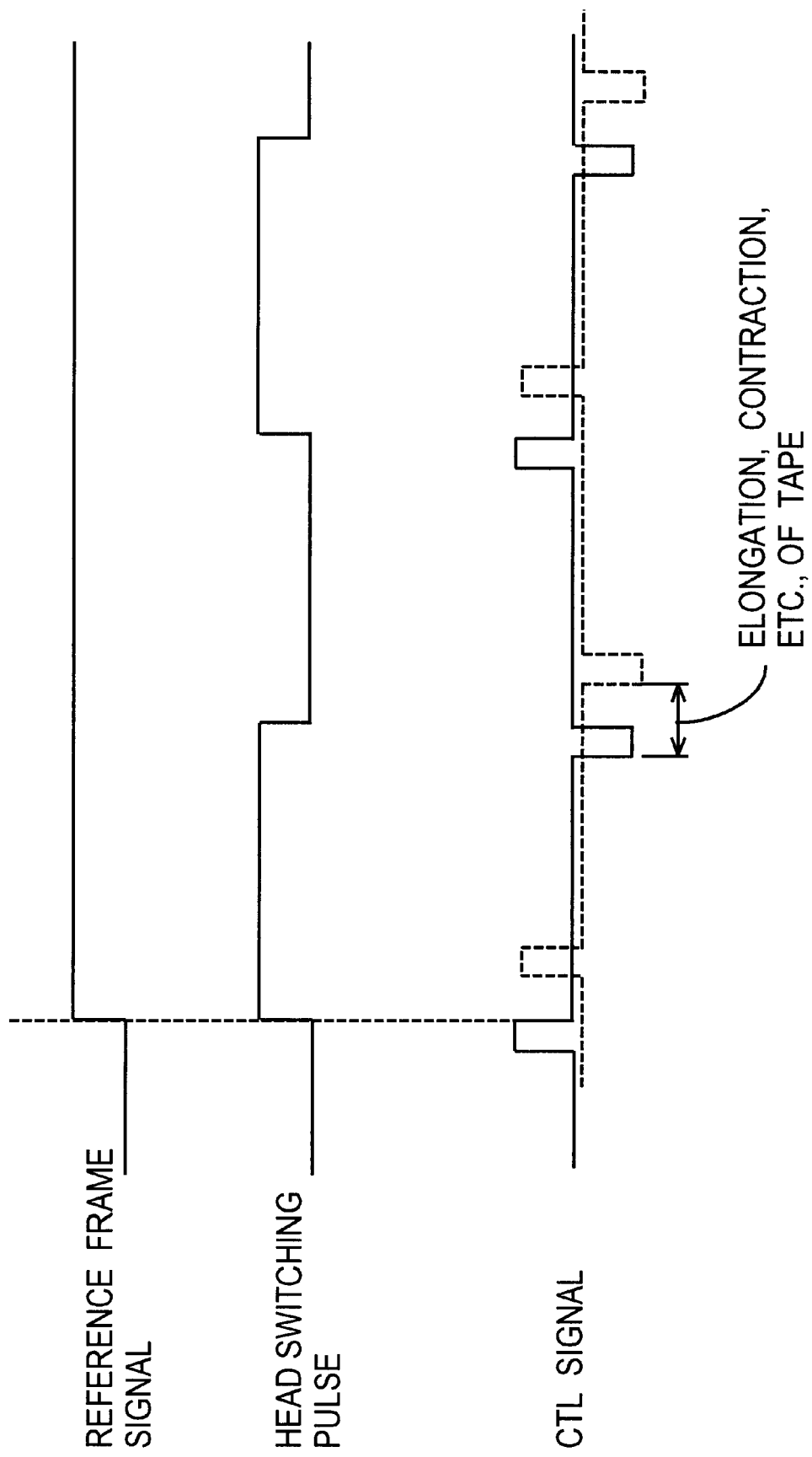
FIG. 6 is a motion explaining chart of the CTL phase shift detecting section of the magnetic recording and reproducing device shown in FIG. 5.

FIG. 6 is a time chart showing the phase relation between the reference frame signal, the head switching pulse signal and the CTL signal when the ATF tracking reproduction is effected as the capstan motor driving section 20 selects the tracking error signal from the tracking control section 10.

In FIG. 6, the phase of the CTL signal reproduced from the magnetic tape 1 by the fixed magnetic head 12 is deviated from the design phase shown in solid lines owing to changes with time, such as elongation or contraction of the magnetic tape, having a DC offset shown in broken lines. Thus, by correcting the detected position by an amount corresponding to the offset, it is possible to prevent the precision of detection from decreasing owing to the phase shift of the CTL signal.

The magnetic recording and reproducing device according to the second embodiment described above has the following effects in addition to the effects of the magnetic recording and reproducing device according to the first embodiment.

The detection and storage of the phase shift of the CTL signal during ATF tracking control removes the offset in the CTL signal due to the elongation or contraction of the magnetic tape and enables the detection of the stop position of the tape to be made with precision despite changes with time due to the elongation or contraction of the magnetic tape.

Further, the detection and storage of the phase shift of the CTL signal during ATF tracking control makes it possible, in the case where clogging takes place in the rotary magnetic head, to achieve precision tracking control by switching to a control mode using the CTL signal.

A magnetic recording and reproducing device showing a third embodiment of the invention will now be described.

Figure 7:
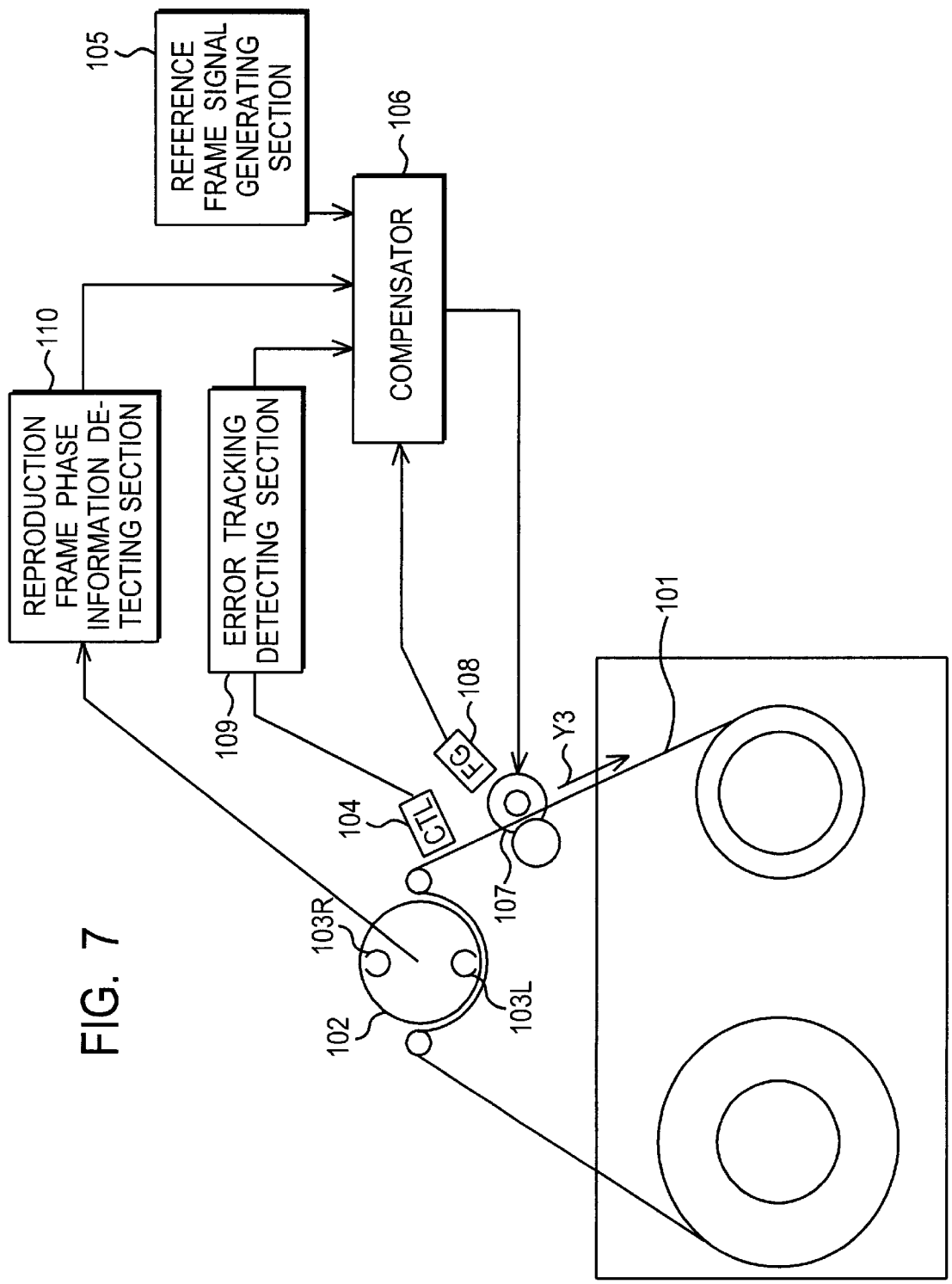
FIG. 7 is a block diagram of a magnetic recording and reproducing device showing a third embodiment of the invention.

FIG. 7 is a block diagram showing the arrangement of the magnetic recording and reproducing device according to the third embodiment.

In FIG. 7, the magnetic tape 101 is wrapped around a rotary cylinder 102 and driven in the direction of arrow Y3. The rotary cylinder 102 has magnetic heads 103R and 103L mounted thereon at symmetrical positions. Further, a fixed magnetic head 104 is disposed for reproducing the linear track along the direction of travel of the magnetic tape 101. Further, a reference frame signal generator 105 is used to generate the reference frame signal. The magnetic tape 101 is driven at a constant speed by a capstan motor 107 which drives the capstan. The capstan motor 107 has the FG detector 108 connected thereto, and its output is fed into a compensator 106. The tracking error detector 109 is used to detect an error signal from the signal from the reproducing magnetic head 104, while the reproduction frame phase information detector 110 is used to detect the phase information on the reproduction frame, their outputs being fed into a compensator 106. The compensator 106 drives the capstan motor 107 on the basis of these signals, as will be later described.

Figure 8:
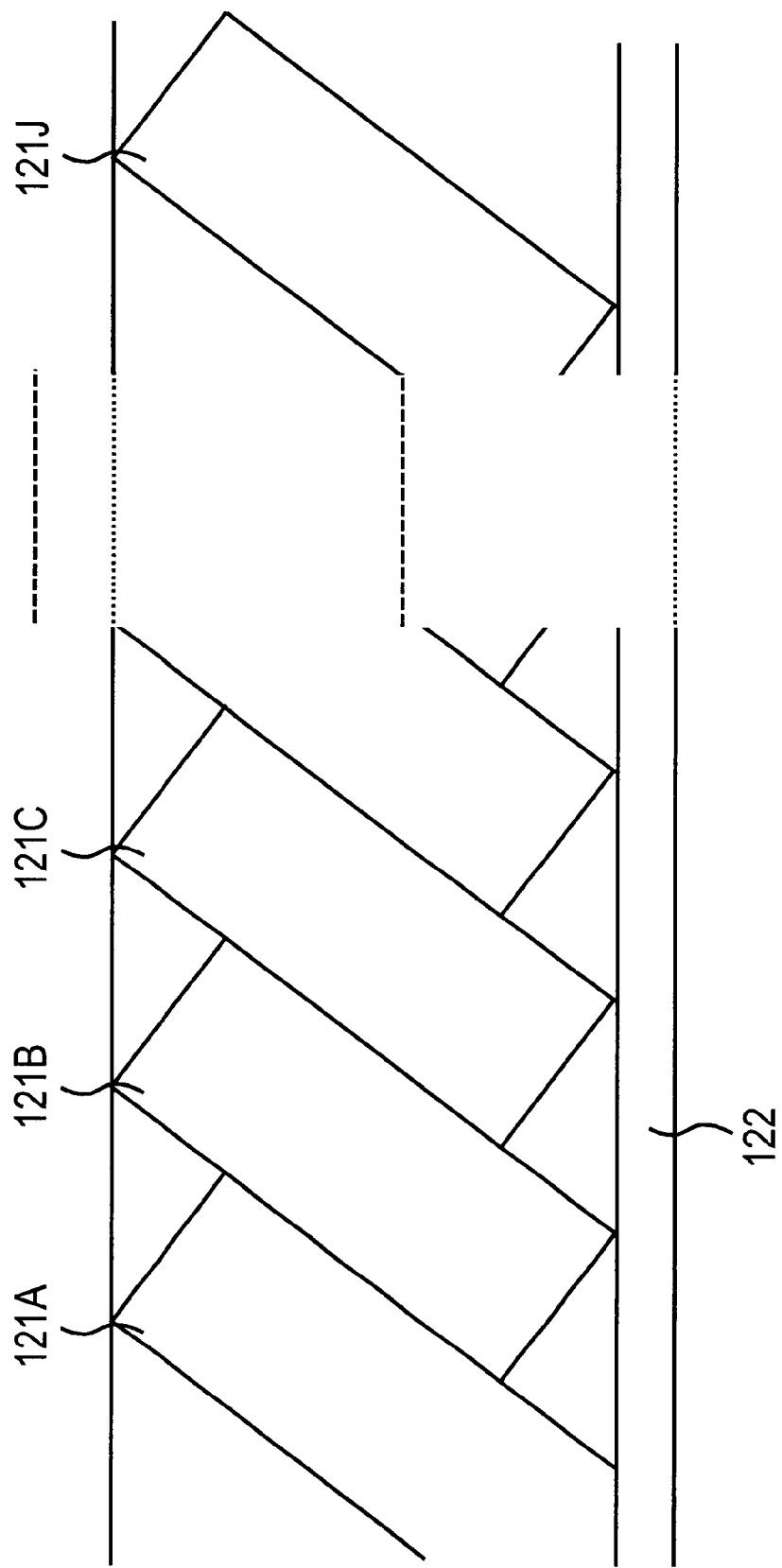
FIG. 8 is a schematic view showing an example of a recording pattern in the magnetic tape of the magnetic recording and reproducing device shown in FIG. 7.

An example of a record pattern on the magnetic tape 101 used in this magnetic recording and reproducing device is shown in FIG. 8. The characters 121A–121J denote tracks in which the usual recorded signal and the reproduction frame phase information are recorded, and 122 denotes the CTL track. To obtain the reproduced image from this magnetic tape 101, it is necessary to control the tracking such that the magnetic heads correctly land on the tracks and at the same time the phase of the reference frame signal obtained from the reference frame signal generator coincides with the phase of the reproduction frame phase information obtained from the reproduction signal.

The slow reproduction operation using this device will now be described.

First, the rotary cylinder 102 rotates at a predetermined rpm, and data is read from the magnetic tape 101 wrapped around the rotary cylinder 102 by the magnetic heads 103R and 103L, so as to output the reproduced signal. Suppose that in the beginning, the magnetic tape 101 is at a stop. First, when the reference frame signal is outputted from the reference frame signal generator 105, the predetermined timing is calculated by the compensator 106. And the capstan motor 107 is started by the capstan control signal. Then the capstan motor 107 is accelerated at a constant rate until it reaches the predetermined speed. The compensator 106 controls the feed speed of the magnetic tape 101 by the FG signal obtained from the FG detector 108 so as to cause the capstan motor 107 to attain the predetermined speed.

Simultaneously therewith, using the CTL signal obtained from the fixed magnetic head 104, the tracking error detector 109 detects a tracking error, effecting the tracking control. At the same time, the reproduction frame phase information detector 110 detects the reproduction frame phase information from the reproduction signal, and the compensator 106 thereby feeds the magnetic tape 101 by an amount corresponding to about M frames. After feeding the magnetic tape by an amount corresponding to M frames, the capstan motor 107 is switched to the brake mode for deceleration (M and N being any natural numbers). And the capstan motor 107 is stopped for the time corresponding to about N frames.

Figure 9:
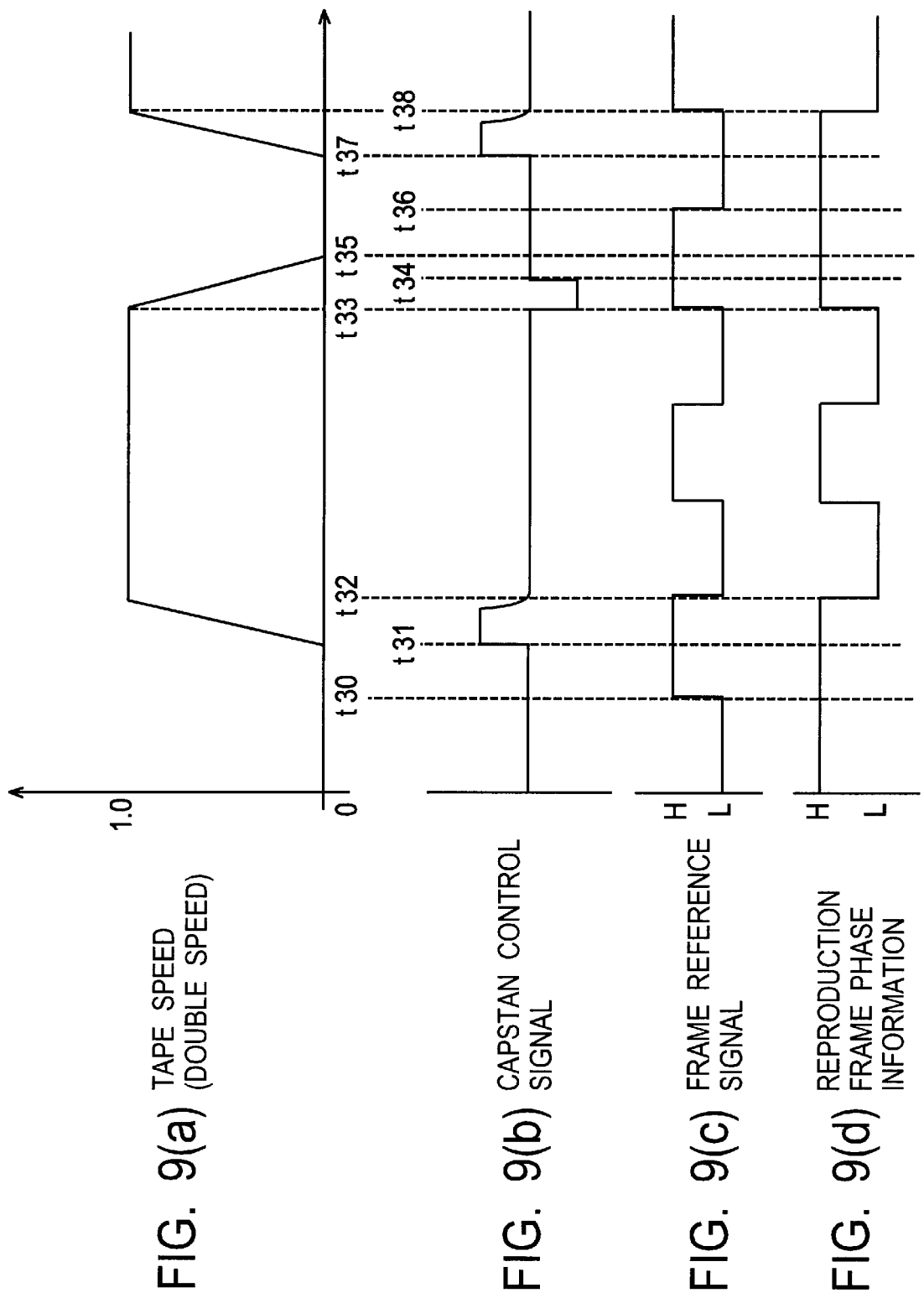
FIG. 9 is a time chart showing the motion of slow reproduction in the magnetic recording and reproducing device shown in FIG. 7.

FIG. 9 shows the time chart for the slow operation. FIG. 9(a) shows the travel speed of the magnetic tape; FIG. 9(b) shows the capstan control signal showing accelerating and decelerating instructions to the capstan motor; FIG. 9(c) shows the frame reference signal which shows the demarcation between frames by a binary system using H and L; FIG. 9(d) shows the reproduction frame phase information which shows the demarcation between reproduction frames by the binary system using H and L from the track being reproduced by the magnetic head.

In FIG. 9, first, at time t30, the value of the frame reference signal is switched from L to H. At this time, as soon as the capstan motor 107 reaches the predetermined speed, the compensator 106 calculates the time t31 for starting acceleration such that the phase of the frame reference signal coincides with the phase of the reproduction frame phase information at time t32. And As shown in FIG. 9(b), the capstan control signal which shows acceleration at time t31 is outputted, to accelerate the capstan motor 107. Then, at time t32, the capstan motor 107 reaches the predetermined speed, the division of the frame reference signal coincides with the division of the reproduction frame phase information and so do their phases. From here, the magnetic tape 101 is fed M frames by the capstan motor 107. Then, at time t33, the capstan motor 107 is switched to the brake mode and, as shown in FIG. 9(b), the capstan control signal showing the decelerating signal is outputted to decelerate the capstan motor 107. After a given period of time, at time t34, the deceleration instruction is stopped from being given to the capstan motor 107, so as to allow the latter to come to a natural stop (at time t35). And after the capstan motor is stopped for a time corresponding to N frames, the start timing for the capstan motor 107 is again calculated at time t36, the same operation being repeated. Thus, the capstan motor 107 effects intermittent feed corresponding to about M frames and then it is stopped for a predetermined time. Because of the period of this intermittent feed, the speed of the slow operation is defined as M/(M+N).

As described above, in the magnetic recording and reproducing device according to the third embodiment, the capstan motor is started with a predetermined timing in synchronism with the frame reference (or field reference) signal and after the magnetic tape has been moved by about M frames, brakes are applied in response to the reproduction frame phase information from the reproduction signal to stop the magnetic tape for a time corresponding to N frames, whereby the M/(M+N) times slower operation can be achieved without requiring a special circuit or complicated software-wise processing.

A magnetic recording and reproducing device according to a fourth embodiment of the invention will now be described.

Figure 10:
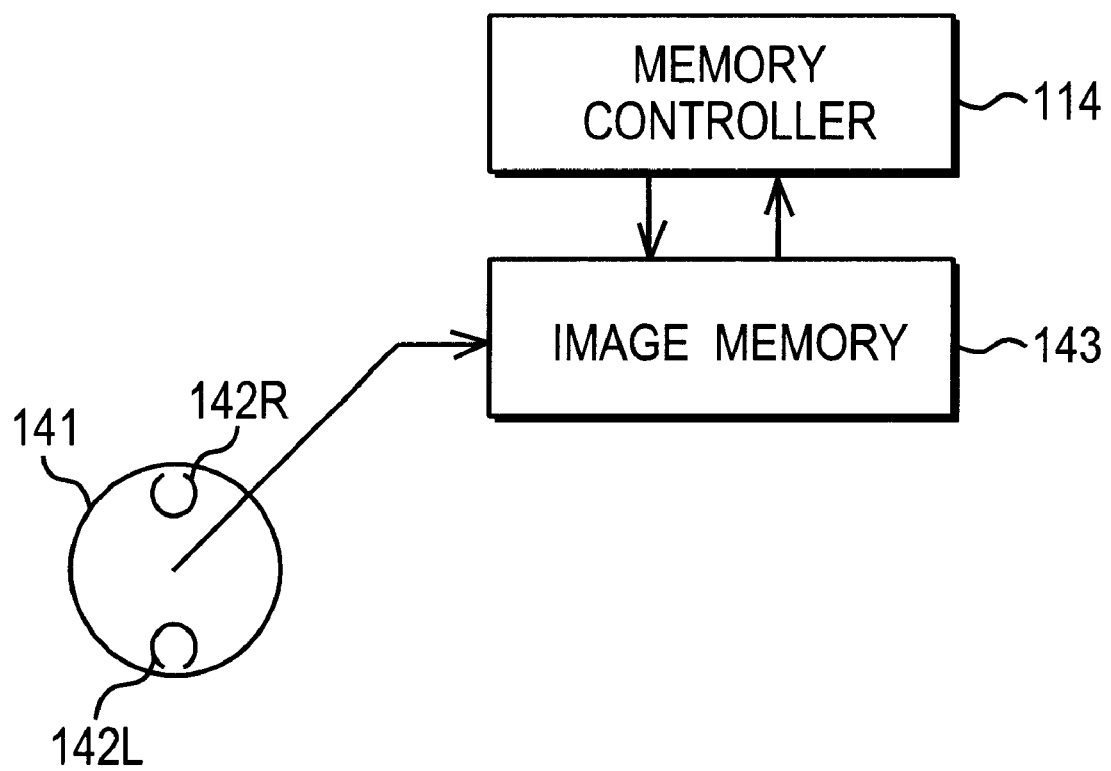
FIG. 10 is a block diagram of the magnetic head section of a magnetic recording and reproducing device showing a fourth embodiment of the invention.

FIG. 10 is a block diagram of a magnetic head in the fourth embodiment. In FIG. 10, a rotary cylinder 141 has magnetic heads 142R and 142L attached thereto. An image memory 143 which is a memory for storing image data is a memory for temporally holding the reproduction signal outputted from the magnetic head, and a memory controller 144 is used to control the image memory 143. The rest of the arrangement is the same as in the first embodiment.

Figure 12:
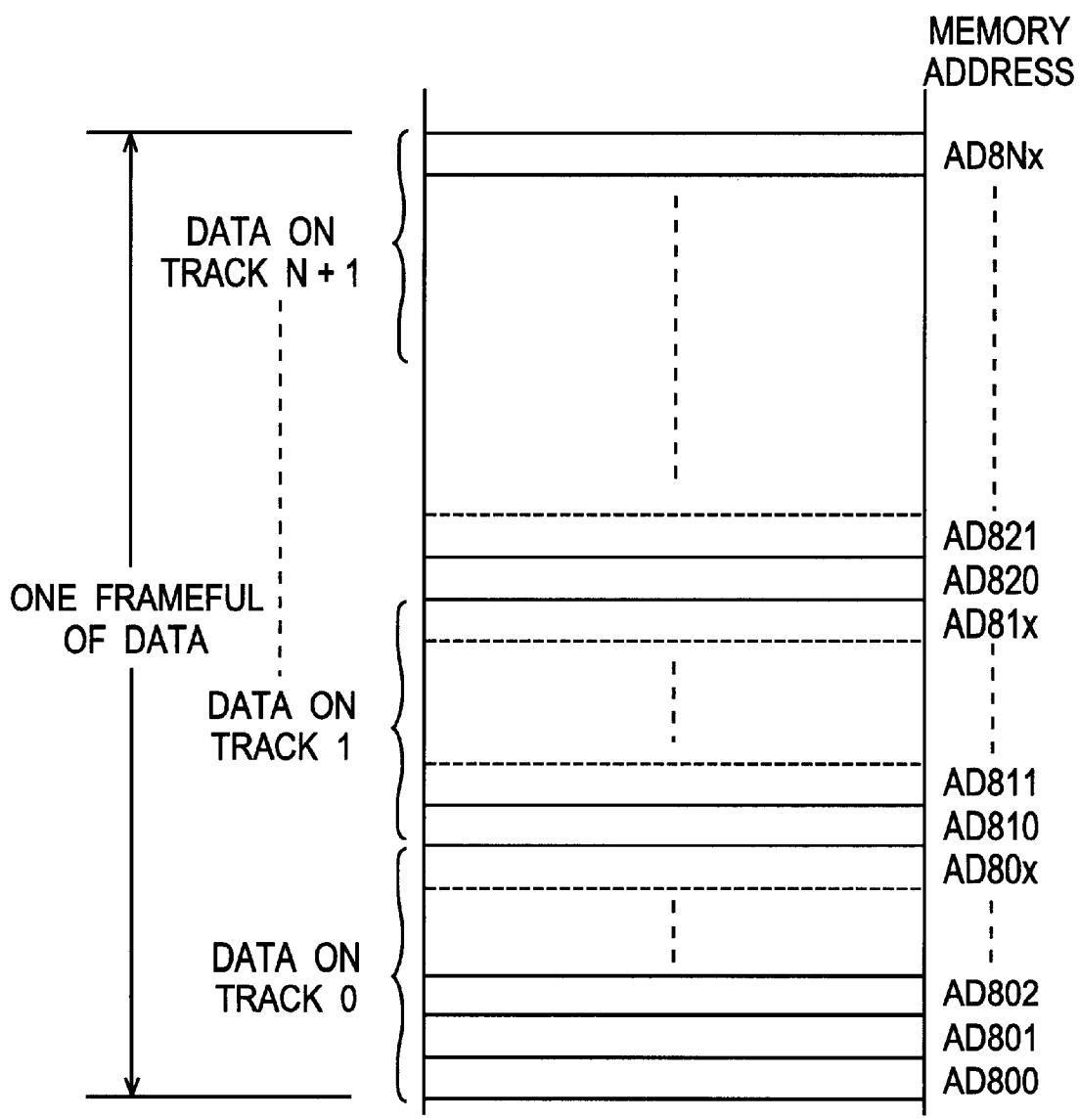
FIG. 12 is a schematic view showing the image memory arrangement of the magnetic recording and reproducing device shown in FIG. 10.

FIG. 12 is a schematic view showing the arrangement of the image memory 143. When data for one frame is divided and recorded on N tracks, data for the track 1 is stored successively in the memory addresses AD810, AD811, . . . , D81x by the scanning by the magnetic head of the VTR, and then the data for the track 2 is stored, beginning with AD820; in this manner, data for one frame each time is stored until AD8Nx is reached. Thus, reproduction data is stored in predetermined addresses in the image memory 143 by the memory controller 144. As compared with FIG. 7, the timing for applying brakes to the capstan is determined on the basis of the reproduction data for each frame actually obtained by ascertaining the addresses and data stored in the image memory 143, whereby slow reproduction which is highly reliable with no noises appearing on the screen is made possible.

As described above, with the magnetic recording and reproducing device according to the fourth embodiment, there is prepared a memory for storing the reproduction signal and the brake timing is determined by the address for the image memory, whereby brakes can be applied at the optimum position, and by checking the contents of the memory, a reproduced image with no noise can be reliably obtained and the reliability can be increased.

A magnetic recording and reproducing device according to a fifth embodiment of the invention will now be described.

Figure 11:
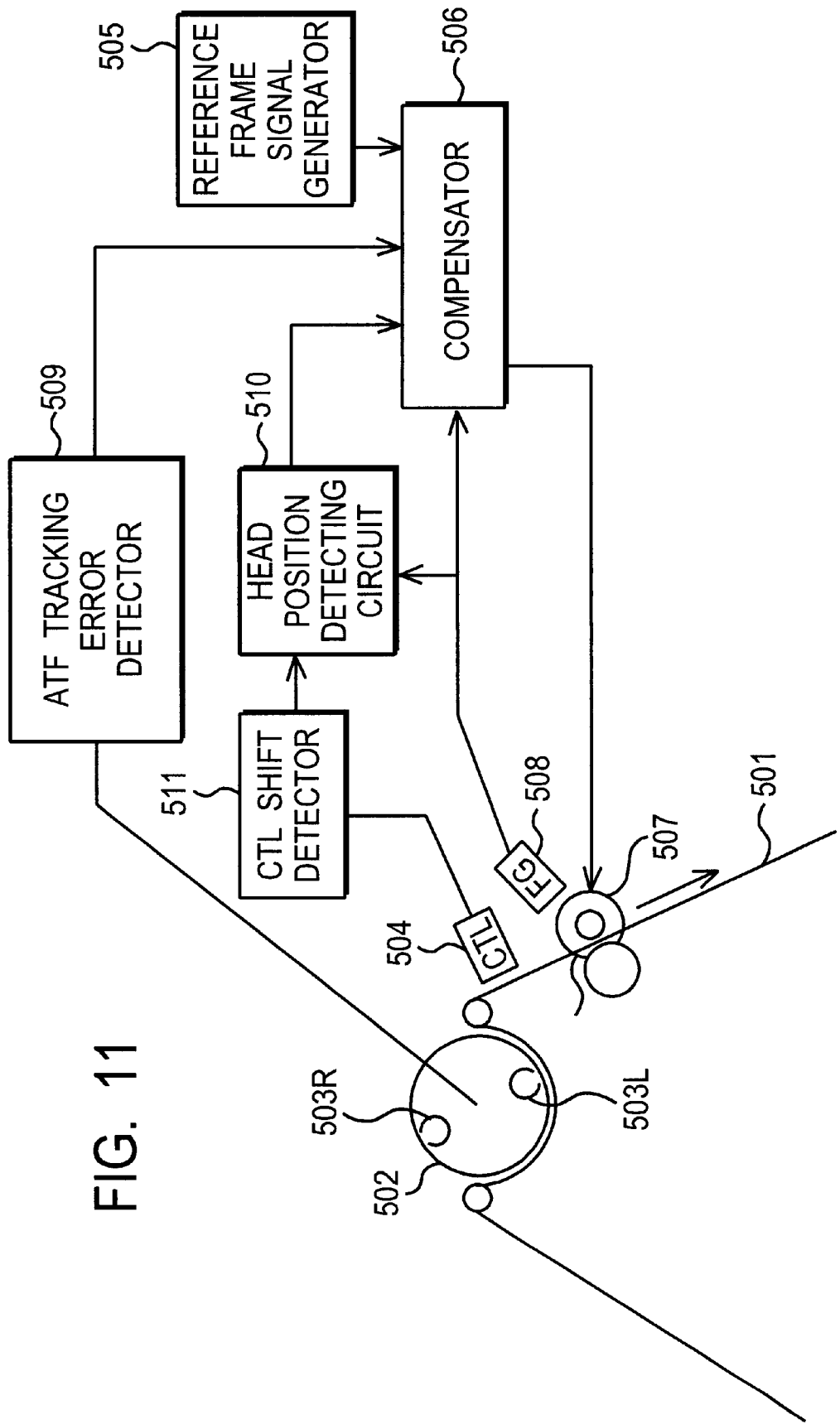
FIG. 11 is a block diagram of a magnetic recording and reproducing device showing a fifth embodiment of the invention.

FIG. 11 is a block diagram showing the arrangement of the magnetic recording and reproducing device according to the fifth embodiment. A magnetic tape 501, rotary cylinder 502, magnetic heads 503L and 503R, fixed magnetic head 504, reference frame signal generator 505, compensator 506, capstan motor 507, and FG detector 508 are the same as those described in the third embodiment and correspondingly numbered from 101 through 108.

In FIG. 11, the ATF tracking error detector 509 detects the level difference produced by the tracking error from the pilot signal recorded in advance on oblique tracks of the magnetic tape. The head position detecting circuit 510 is used to detect what position on the magnetic tape the magnetic head scans, by calculating the number of pulses of FG signal obtained during the period of the reproduction CTL signal. The numeral 511 denotes a CTL shift detecting circuit for detecting the shift of the reproduction CTL signal from the reference frame signal. The rest of the arrangement is the same as in the third embodiment.

As described above, in the magnetic recording and reproducing device according to the fifth embodiment, correct frame synchronization and hence stabilized slow operation can be attained even when there is an error in regard to the position for installing the fixed magnetic head or an error due to changes with time, such as elongation or contraction of the magnetic tape or a phase shift in the CTL signal during interchangeable reproduction.

In addition, the brake timing for the capstan motor and the basis of the number of pulses of FG signal in the frame division have been described using the pulses of the CTL signal; however, the invention is not limited thereto as it is likewise applicable provided that the position of the head when stopped can be detected.

A magnetic recording and reproducing device showing a sixth embodiment of the invention will now be described.

FIG. 13 is a block diagram showing the arrangement of the magnetic recording and reproducing device according to the sixth embodiment. In FIG. 13, magnetic heads 210a and 210b are attached adjacent each other to a rotary drum 201 on the same base with their heights differing by one track from each other; 202 denotes a magnetic tape; 203 denotes a capstan motor for moving the magnetic tape 202 at a predetermined speed; 204 denotes a capstan driving section for driving the capstan motor 203; 205 denotes an information signal generating section for generating an information signal to be sent to the magnetic heads 210*a* and 210*b*; and 206 denotes a stop and start control section for controlling the stop and start timing for the capstan motor 203 and the output timing for the information signal, with the timing which is in synchronism with the phase of rotation of the rotary drum 201.

The operation of the magnetic recording and reproducing device arranged in the manner described above will be described with reference to FIG. 14.

Figure 14A:
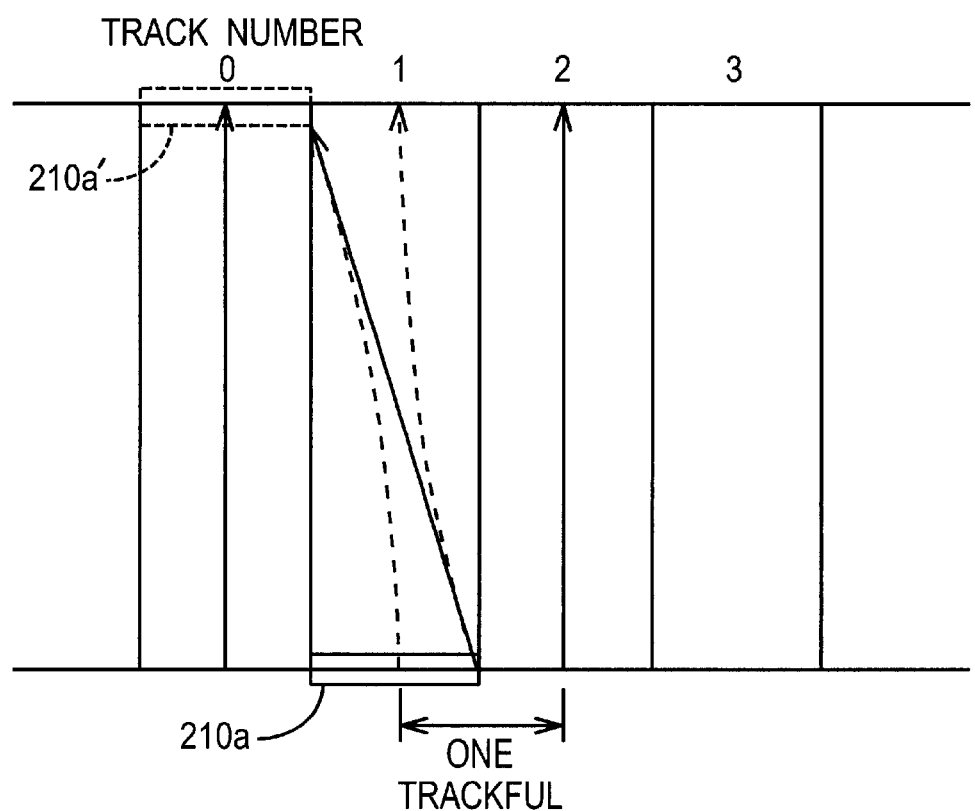
FIGS. 14(a) and (b) are motion explaining charts for intermittent recording in the magnetic recording and reproducing device shown in FIG. 13.
Figure 14B:
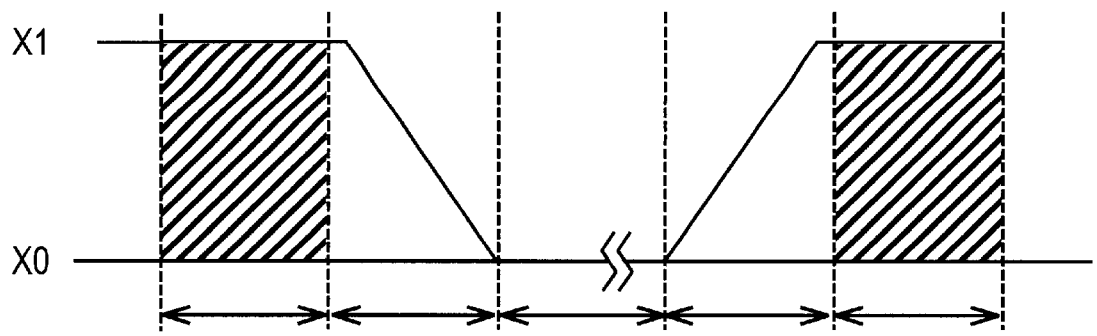

FIG. 14(*a*) schematically shows the track pattern on the magnetic tape. In this example, with attention paid to the magnetic head 21 alone, the scanning trail of the magnetic head for intermittent recording is shown. FIG. 14(*b*) shows the speed at which the magnetic tape 202 is fed by the capstan motor 203. The mark "x1" indicates the same speed state as in the normal recording and reproducing, and "x0" indicates the stop state. In addition, the wrapping angle (effective track angle) at this time is supposed to be 180 degrees.

In FIG. 14, the magnetic head 210*a* scans and records the track 0 (①  in the figure) at the ordinary speed, then the magnetic tape is immediately decelerated (② in the figure) and stopped (③ in the figure). When the track 2 is to be recorded, the magnetic tape is accelerated in the ineffective region (④ in the figure) and the recording of the track 2 is effected (⑤ in the figure). At this time, in the decelerated state (② in the figure) and in the accelerated state (④ in the figure), the magnetic tape is controlled such that it is fed by an amount corresponding to one track.

Let α be the absolute value of the deceleration and acceleration of the capstan motor 203, then α can be expressed; α=K·T/J (where K: proportionality constant, J: moment of inertia, T: motor torque).

Further, let to be the time taken for the magnetic head 210 to scan one track, then the distance X travelled by the tape during deceleration or acceleration operation is expressed; X=α to2. Further, since the magnetic tape is fed by an mount corresponding to one track per track scan time to during normal recording, the motor torque T is expressed; T=Xo·J/(K·to2) where Xo is the distance travelled by the tape.

Therefore, the tape travel distance can be set at the desired value (corresponding to one track) by selecting the above torque for one track scan time during deceleration or acceleration and effecting deceleration or acceleration.

In addition, in this example, the description has been given of the case where the magnetic head scans an even number of tracks. In the case of the magnetic head 210*b*, the odd-numbered tracks are recorded and the operation is the same as in the magnetic head 210*a*.

Figure 15B:
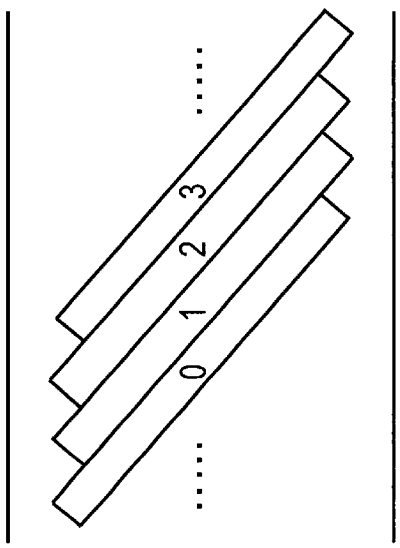
FIGS. 15(a) and (b) are motion explaining for intermittent recording in the magnetic recording and reproducing device shown in FIG. 13.
Figure 15A:
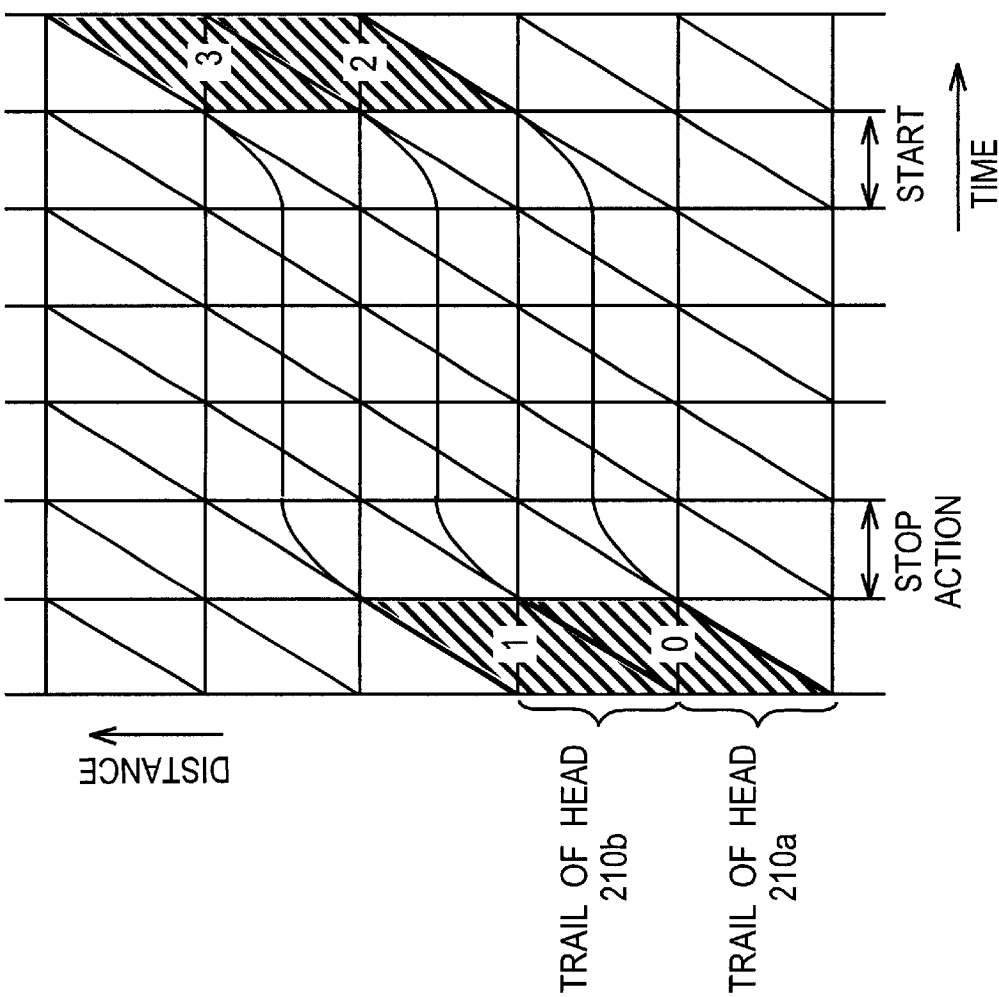

As described above, in the magnetic recording and reproducing device according to the sixth embodiment, as shown in FIG. 15(*a*) which shows the head scan trail, since the stoppage and start of the magnetic tape is effected in other than the effective region for recording (other than the shaded area), stabilized intermittent recording without the bending of a track to be recorded can be attained.

In addition, even at wrapping angles of other than 180 degrees, the operation of the magnetic tape being fed by an amount corresponding to one track during deceleration or acceleration is the same, but the distance of travel in the direction of tape feed differs and this will be described below.

Figure 16A:
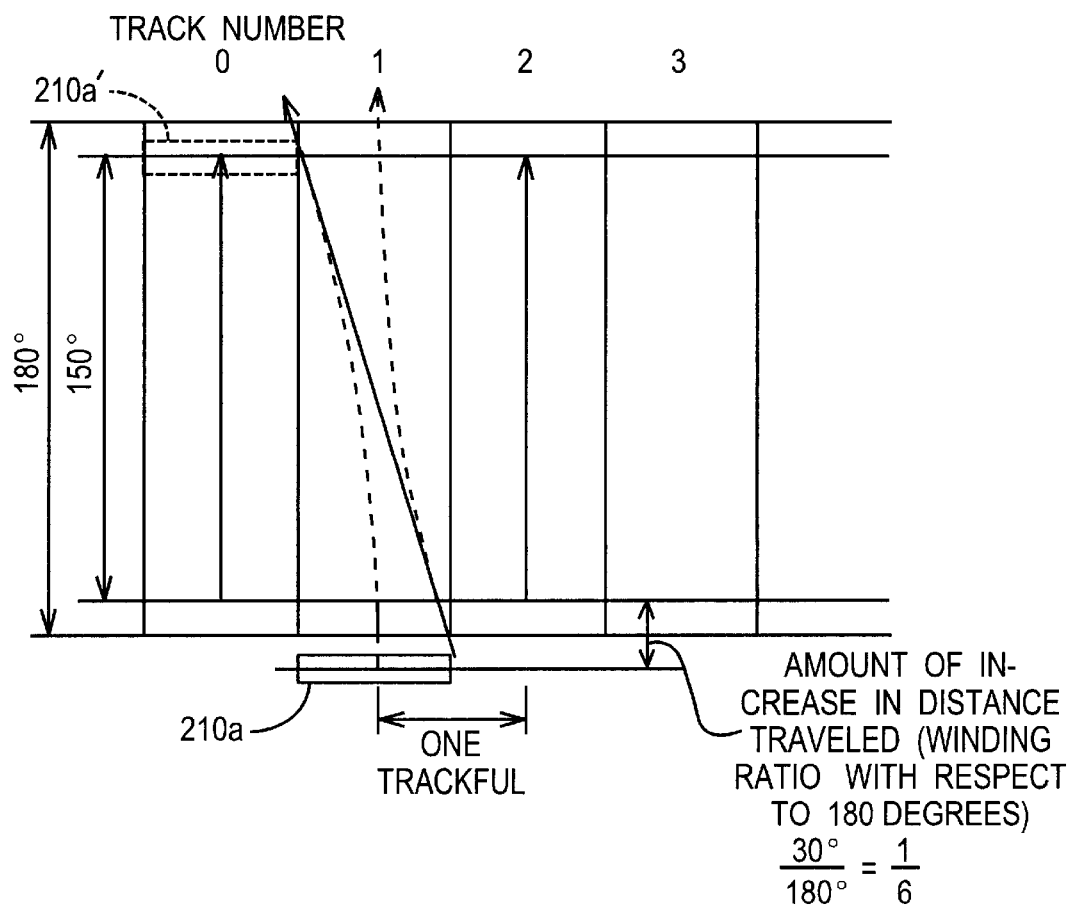
FIGS. 16(a) and (b) are motion explaining charts for intermittent recording with a wrapping angle of 150 degrees in the magnetic recording and reproducing device shown in FIG. 13.
Figure 16B:
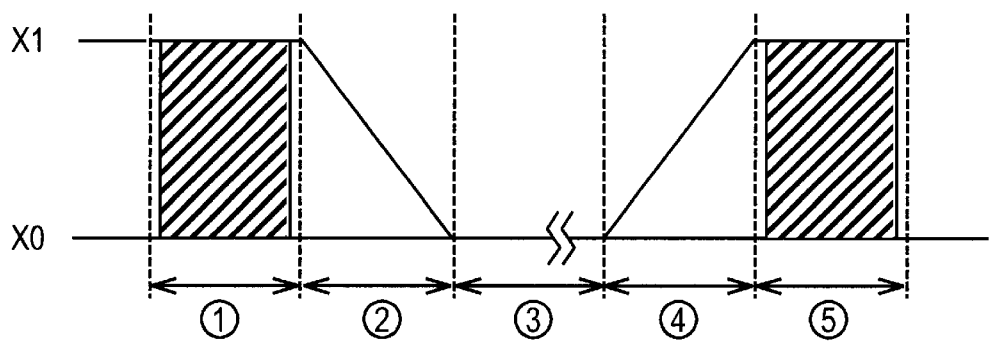

FIG. 16 is a motion explanation chart for intermittent recording at a wrapping angle of not more than 180 degrees, e.g., 150 degrees. At a point of time of termination of the recording of the track 0, the magnetic head 210*a* is in the illustrated position (the same position as in the broken line 210*a*'). The distance travelled from this point of time till the time the next track 2 is recorded corresponds, in the track width, to one track. On the other hand, in the tape feed direction, the distance of travel is 7/6 of the value for a wrapping angle of 180 degrees, as the effective region is shortened by an amount of 30 degrees. Therefore, with the same deceleration or acceleration as in the case of a wrapping angle of 180 degrees, the magnetic tape is moved for more time in the ordinary speed state, the excess time being to /6 of the time taken for the wrapping angle of 180 degrees.

Figure 17A:
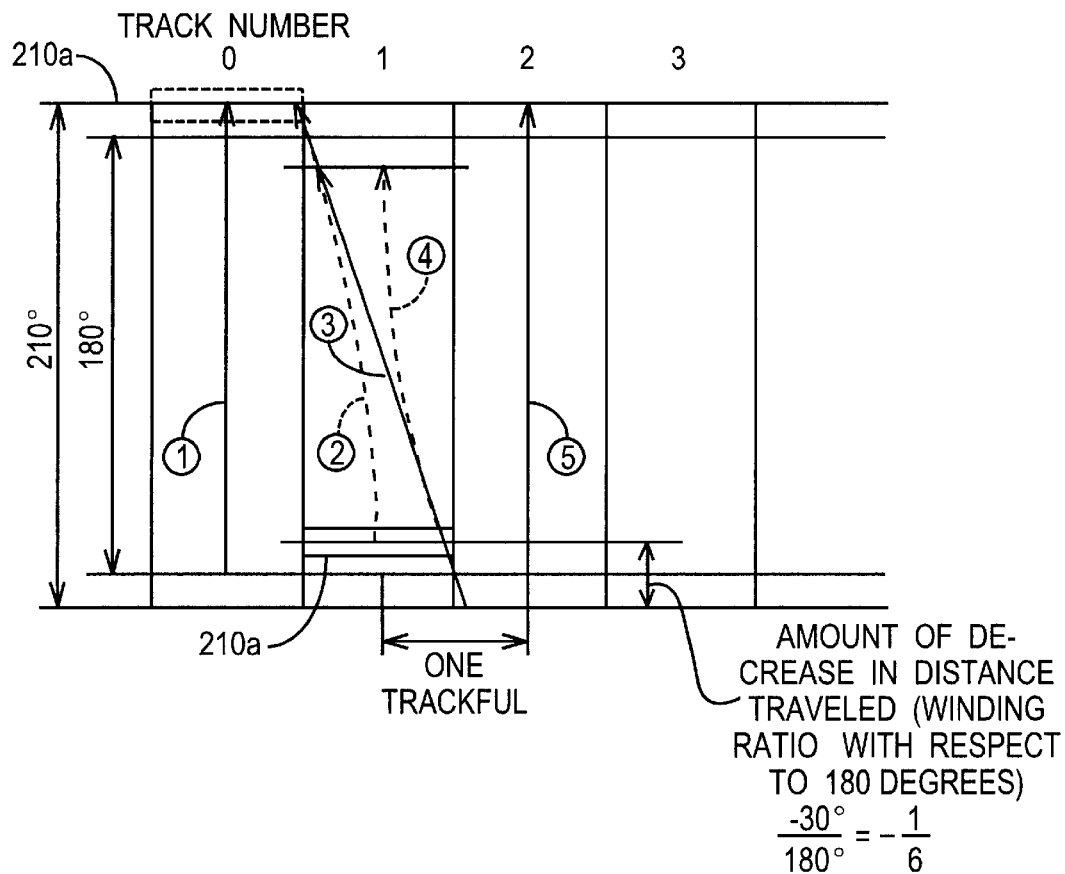
FIGS. 17(a) and (b) are motion explaining charts for intermittent recording with a wrapping angle of 210 degrees in the magnetic recording and reproducing device shown in FIG. 13.
Figure 17B:
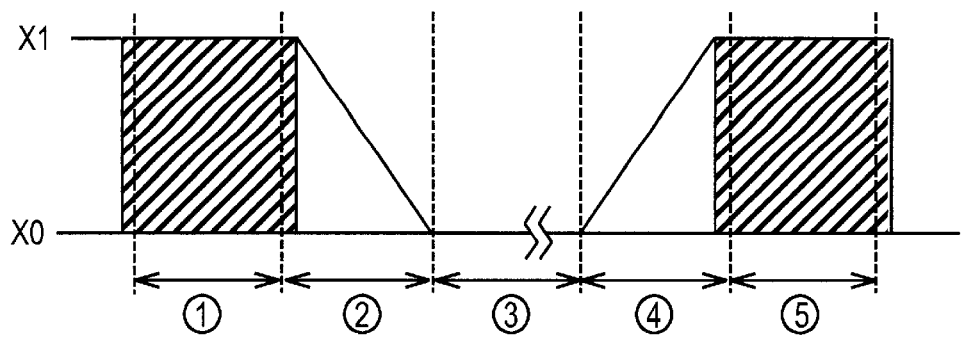

FIG. 17 is a motion explanation chart for intermittent recording at a wrapping angle of not more than 180 degrees, e.g., 210 degrees. At a point of time of termination of the recording of the track 0, the magnetic head 210*a* is in the illustrated position (the same position as in the broken line 210*a*'). The distance travelled from this point of time till the time the next track 2 is recorded corresponds, in the track width, to one track. On the other hand, in the tape feed direction, the distance of travel is 5/6 of the value for a wrapping angle of 180 degrees, as the effective region is prolonged by an amount of 30 degrees.

Therefore, when it is desired to effect deceleration or acceleration within one track scan, deceleration or acceleration should be increased as compared with the case of a wrapping angle of other than 180 degrees. For example, if the deceleration or acceleration time is set at 5/6 of the value for 180 degrees, the absolute value of deceleration or acceleration is set at 6/5 of the value for 180 degrees.

As described above, for a wrapping angle of other than 189 degrees, the amount of travel in the direction of feed of the magnetic tape can be easily designed according to the wrapping angle.

As described above, in the magnetic recording and reproducing device according to the sixth embodiment, the information signal is recorded on the track by the pair of magnetic heads attached adjacent each other to the rotary drum with their heights differing by one track from each other; therefore, by effecting stoppage and start upon termination of recording and feeding said magnetic tape by an amount corresponding to one track before the next recording is started, stoppage and start can be effected in the ineffective region even during intermittent recording, without causing the bending of a track to be recorded. Therefore, during the reproduction, a stabilized image can be obtained without causing envelope chipping.

A magnetic recording and reproducing device showing a seventh embodiment of the invention will now be described.

Figure 18:
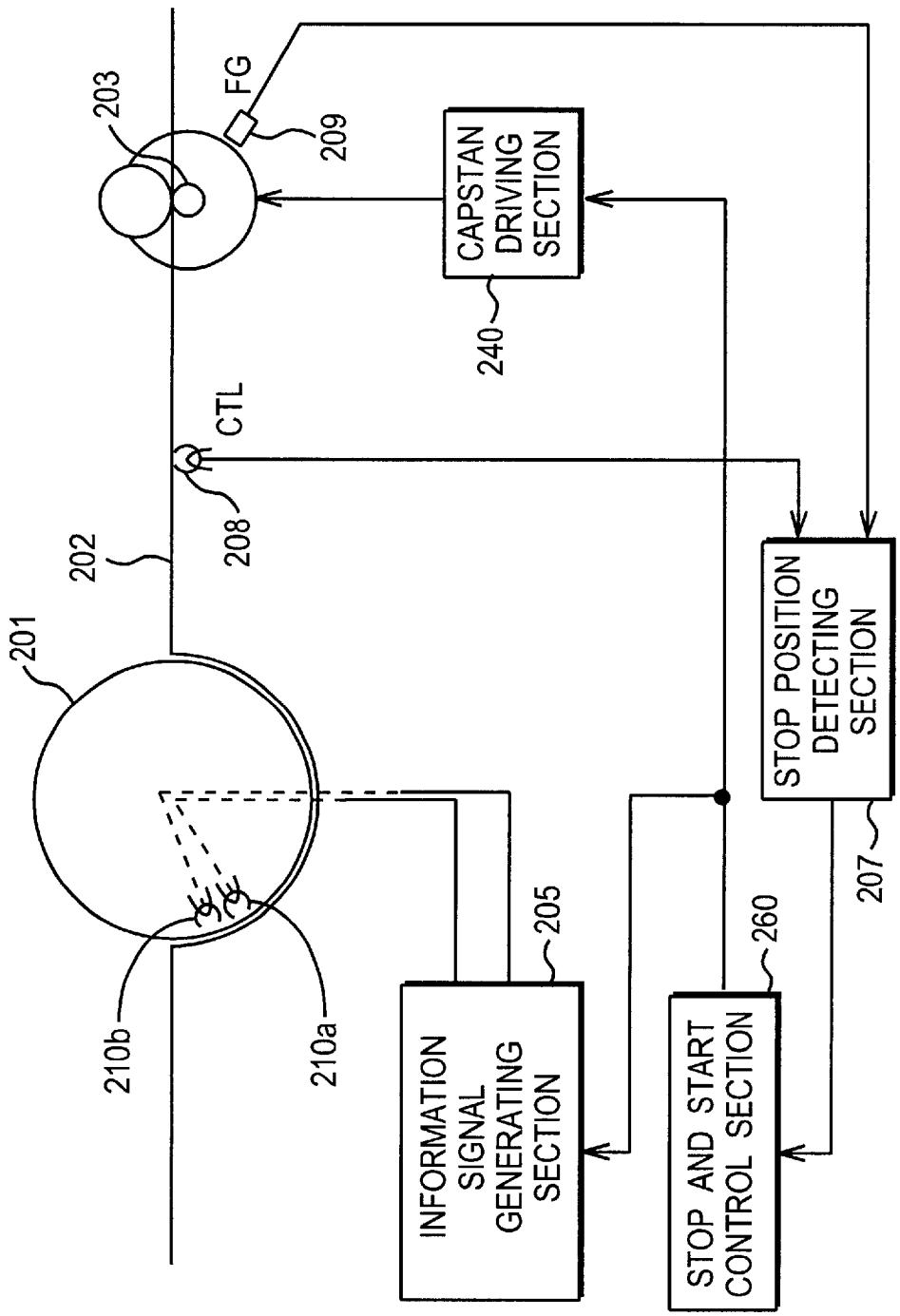
FIG. 18 is a block diagram of a magnetic recording and reproducing device showing a seventh embodiment of the invention.

FIG. 18 is a block diagram showing the arrangement of the magnetic recording and reproducing device according to the seventh embodiment. In addition, those parts which function in the same way as in the magnetic recording and reproducing device of the sixth embodiment are given the same reference characters and a description thereof is omitted.

In FIG. 18, the numeral 208 denotes a fixed magnetic head for reproducing the CTL signal recorded on the linear track of a magnetic tape 208; 209 denotes an FG pulse detector for detecting FG pulses magnetized on a capstan motor 203; 207 denotes a stop position detecting section for detecting the stop position of the magnetic tape 202 on the basis of the outputs from the fixed magnetic head 208 and FG pulse detector 209; and 260 denotes a stop and start control section for controlling the stop and start timing for the capstan motor 203 and the output timing for the information signal on the basis of the rotary phase of the rotary drum 201 and the output from the stop position detecting section 207.

The operation of the magnetic recording and reproducing device arranged in the manner described above will be described below with reference to FIGS. 19 and 20. In addition, the wrapping angle (effective track angle) is supposed to be 180 degrees.

Figure 19:
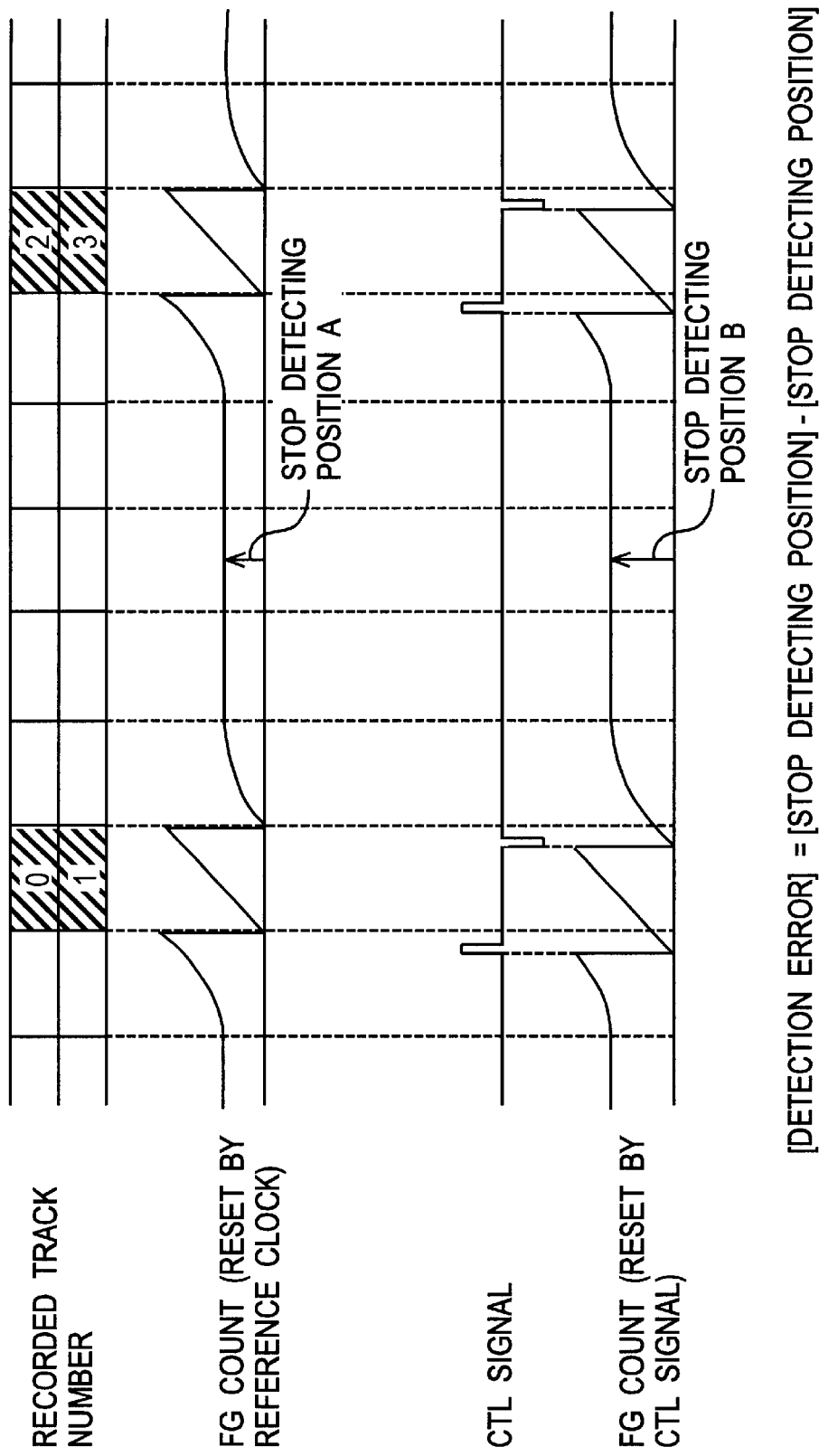
FIG. 19 is a motion explaining chart for the detection of the tape stop position for intermittent recording with a wrapping angle of 150 degrees in the magnetic recording and reproducing device shown in FIG. 13.
Figure 20:
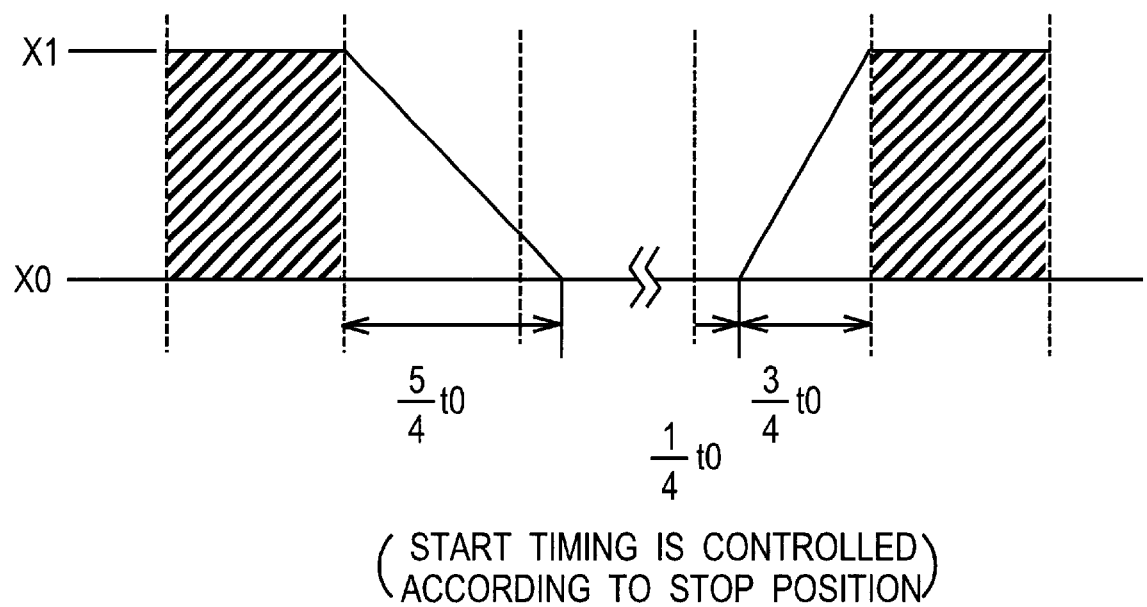
FIG. 20 is a motion explaining chart for intermittent recording in the magnetic recording and reproducing device shown in FIG. 13.

FIG. 19 is a motion explanation chart for tape position detection in the seventh embodiment and FIG. 20 is a motion explanation chart in tape feed in the same embodiment. If the deceleration or acceleration varies owing to a variation in a load, inertia or torque in the capstan motor, this will lead to degradation in precision of the position of a track to be recorded. Therefore, the positional precision can be improved by detecting the stop position of the magnetic tape. As shown in FIG. 19, the stopped tape position is detected by detecting and counting the FG pulses of the capstan motor and resetting the same with the timing which is in synchronism with the rotary drum.

At this time, if intermittent recording is effected by using a preformat tape having the CT1 signal recorded thereon, the precision of the position of a track to be recorded can be further improved by resetting the FG pulse count by the CTL signal which is phase information on the magnetic tape. Further, in the case of making an intermittent record on an unrecorded tape, recording the CTL signal in the effective region makes it possible to obtain correct phase information in normal reproduction or overwrite recording, to thereby improve tracking accuracy.

As shown in FIG. 20, if a travel distance corresponding to the amount for which the magnetic tape is decelerated for stoppage for 5 to /4, the start timing is delayed by to /4 and the magnetic tape is started at 4/3 times the acceleration for the wrapping angle of 180 degrees in the sixth embodiment. Thus, precision can be improved by controlling the start timing and acceleration irrespective of the stop position of the magnetic tape. Further, the arrangement can be simplified by controlling only the start timing while keeping the acceleration at a constant value.

As described above, in the magnetic recording and reproducing device according to the seventh embodiment, the precision of the position of a track to be recorded can be further improved as compared with the sixth embodiment by detecting the tape position by the CTL signal which is phase information on the magnetic tape. Particularly, in a VTR for high density recording with narrow track width, the recording duration can be prolonged.

A magnetic recording and reproducing device showing an eighth embodiment of the invention will now be described.

Figure 21:
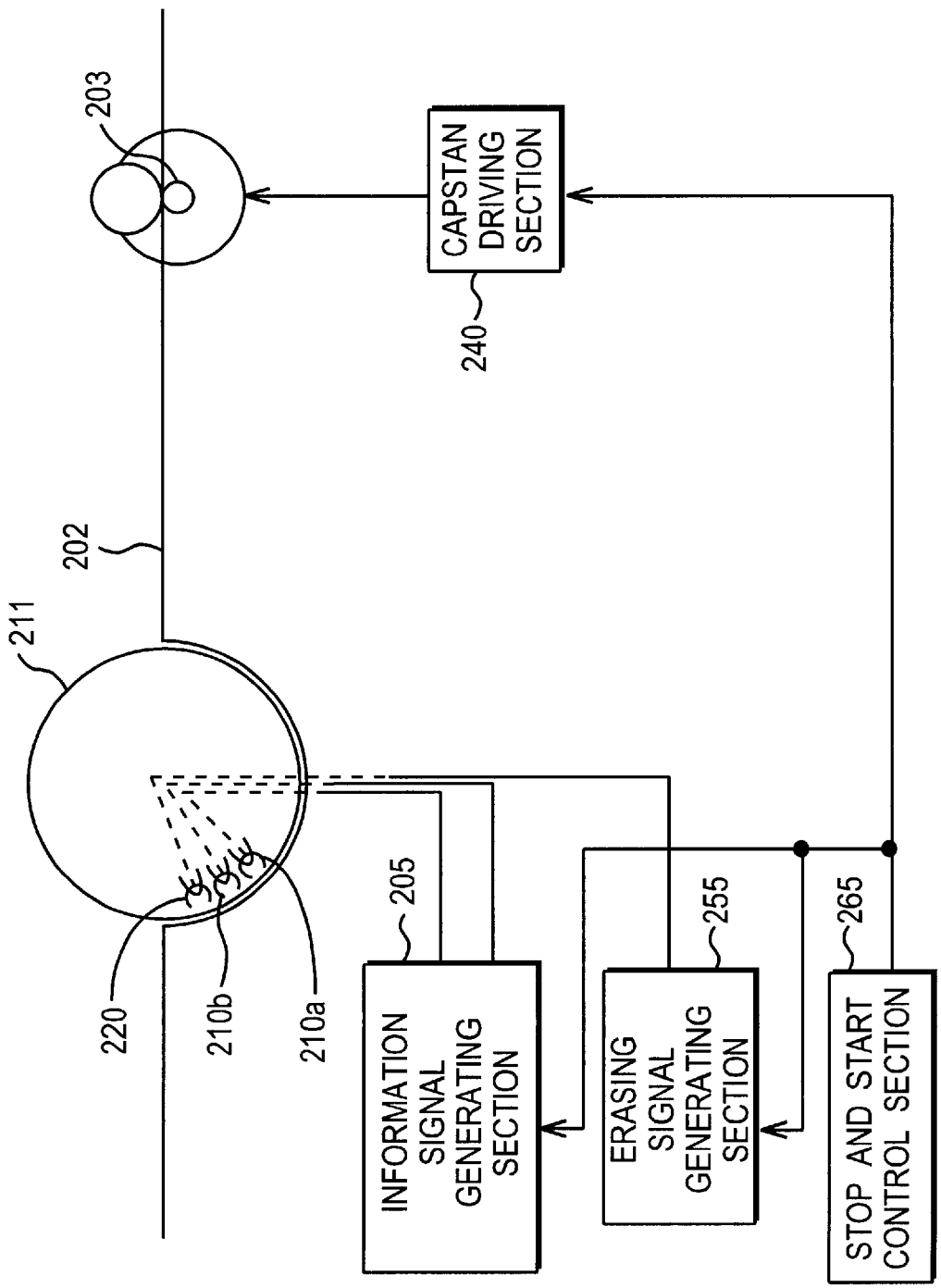
FIG. 21 is a block diagram of a magnetic recording and reproducing device showing an eighth embodiment of the invention.

FIG. 21 is a block diagram showing the arrangement of the magnetic recording and reproducing device according to the eighth embodiment. In addition, those parts which function in the same way as in the magnetic recording and reproducing devices of the sixth and seventh embodiments are given the same reference characters and a description thereof is omitted.

In FIG. 21, magnetic heads 210a and 210b are recording magnetic heads attached adjacent each other to a rotary drum on the same base with their heights differing by one track from each other; 220 denotes an erasing magnetic head attached to the rotary drum 211 on the same base as and adjacent the recording magnetic heads 210a and 210b and two tracks ahead; 255 denotes an erasing signal generating section for generating an erasing signal sent to the erasing magnetic head 220; and 265 denotes a stop and start control section for controlling the stop and start timing of the capstan motor and the output timing for information signal and erasing signal on the basis of the rotary phase of the rotary drum 211.

The operation of the magnetic recording and reproducing device constructed in the manner described above will be described below with reference to FIG. 22.

Figure 22:
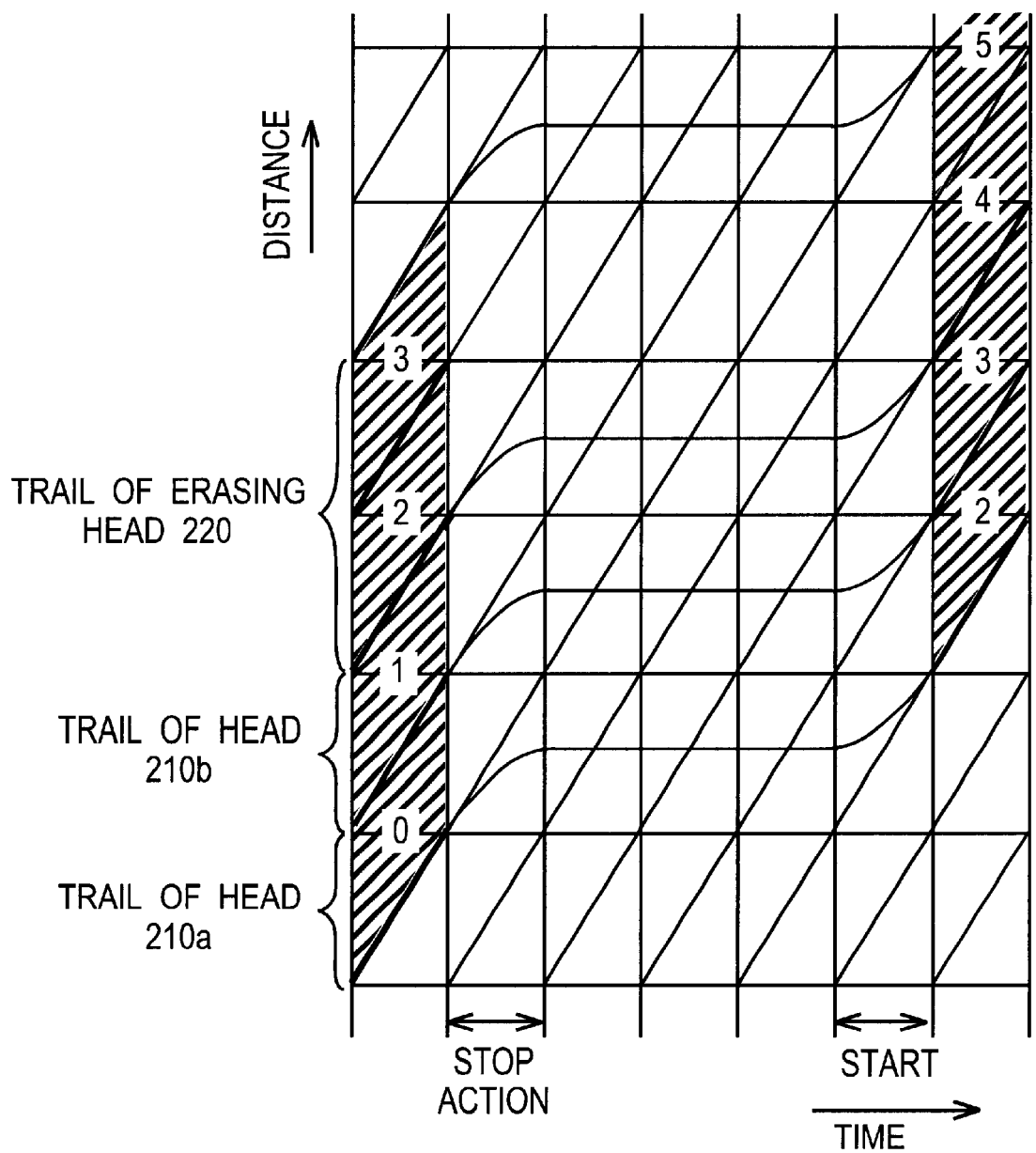
FIG. 22 is a motion explaining chart for intermittent recording in the magnetic recording and reproducing device shown in FIG. 21.

As shown in FIG. 22, as in the case of the sixth embodiment, the magnetic tape is stopped or started in other than the effective region for recording and erasing (other than the shaded areas), and two trackfuls of recording is made by the recording magnetic heads 210a and 210b, and while the erasing head 220, preceding the recording heads, effects two trackfuls of erasing. Thereby, stabilized recording and erasing can be attained without the bending of a track to be recorded. In addition, the wrapping angle (effective track angle) at this time is supposed to be 180 degrees.

In addition, in the same embodiment, like the seventh embodiment, the stop position of the magnetic tape is detected by detecting or counting the FG pulses from the capstan motor and resetting them with the timing which is in synchronism with the rotary drum, whereby the positional precision for recording and erasing can be improved.

In this case also, when it is desired to effect intermittent recording by using a preformat tape having CTL signals recorded thereon, the positional precision for recording and erasing can be further improved. Further, when it is desired to effect intermittent recording on an unrecorded tape, correct phase information can be obtained in overwrite recording by recording CTL signals in the effective region, whereby the tracking precision can be improved.

Further, in the sixth, seventh and eighth embodiments, even if the mutual operation timings for the recording magnetic head and the erasing head are shifted, there will be no limitation due to this shift if the stop and start timings are corrected with the timing which does not work in the effective region.

For example, in the sixth and seventh embodiments, in the case where the magnetic head 210b is attached to the rotary drum 201 ahead of the recording head 210a, the magnetic tape 202 may be controlled such that it is fed by an amount corresponding to two tracks from the time immediate recording by the magnetic head 210a is started till the time the next recording is started. On the other hand, if the erasing magnetic head 220 is attached to the rotary drum 201 ahead of the recording head 210a, the magnetic tape 202 may be controlled such that it is fed by an amount corresponding to two tracks from the time immediate erasing by the erasing magnetic head 220 is started till the time the next erasing is started.

Further, in the sixth, seventh and eighth embodiments, examples of effecting intermittent recording by repetition of stop and start; however, the magnetic tape may be driven slow instead of coming to a complete stop in the ineffective region. Further, the invention is also applicable to a VTR for variable rate recording by controlling the stop time. Further, since recording can be immediately started in response to a recording instruction without requiring prerolling, there will be no failure in recording.

What is claimed is:

1. A magnetic recording and reproducing device comprising:

a signal comprising a predetermined length data in frame units dividedly recorded on X numbers of oblique tracks on a magnetic tape, where X is a positive integer;

a control signal comprising Y numbers of pulses per frame recorded on a linear track of said magnetic tape, where X/Y is a positive integer;

a rotary magnetic head for scanning said magnetic tape to reproduce the signal recorded thereon;

a capstan motor driving means for running the magnetic tape longitudinally;

a reference frame signal generating means for generating a reference frame signal;

a fixed magnetic head for reproducing the control signal recorded on said magnetic tape;

a control signal counting means for counting the reproduced control signals and being reset for every frame unit;

a frequency generator pulse counting means for counting during the travel of the magnetic tape the pulses of a frequency generator signal having a frequency corresponding to the rotative speed of the capstan motor and for resetting the count by the control signal reproduced by said fixed magnetic head; and timing control means for controlling the timing with which the travel of the magnetic tape is started, on the basis of the number of pulses of the frequency generator signal counted by said frequency generator pulse counting means, the count value from said control signal counting means and the reference frame signal from said reference frame signal generating means.

2. A magnetic recording and reproducing device comprising:

a signal comprising a predetermined length of data recorded on oblique tracks of a magnetic tape;

said magnetic tape having a control signal recorded on its linear track;

a rotary magnetic head for scanning a magnetic tape and reproducing said recorded signal;

a capstan motor driving means for running the magnetic tape longitudinally;

a reference frame signal generating means for generating a reference frame signal;

a fixed magnetic head for reproducing the control signal;

a frequency generator pulse counting means for counting during the travel of the magnetic tape a number of pulses of a frequency generator signal, wherein said frequency generator signal has a frequency corresponding to the rotative speed of the capstan motor and for resetting the count by the control signal reproduced by said fixed magnetic head; and timing control means for accurately detecting the phase relation between the rotary magnetic head and the linear track on said magnetic tape and controlling, in the slow or run mode of the magnetic tape, a switch timing with which the magnetic tape is switched to the normal run mode by said capstan motor driving means, on the basis of the number of pulses of the frequency generator signal counted by said frequency generator pulse counting means, and the reference frame signal from said reference frame signal generating means.

* * * * *